United States Patent [19]
Waldner et al.

[11] Patent Number: 6,141,413
[45] Date of Patent: Oct. 31, 2000

[54] TELEPHONE NUMBER/WEB PAGE LOOK-UP APPARATUS AND METHOD

[75] Inventors: Wayne Waldner, Dodgeville; John Morley, Madison, both of Wis.

[73] Assignee: American Tel-A-System, Inc., McFarland, Wis.

[21] Appl. No.: 09/268,127

[22] Filed: Mar. 15, 1999

[51] Int. Cl.$^7$ .................................................. H04M 3/487
[52] U.S. Cl. .................... 379/265; 379/88.17; 379/93.23
[58] Field of Search ......................... 379/67.1, 70, 88.17, 379/88.19, 88.2, 88.21, 90.01, 93.01, 93.17, 93.23, 127, 142, 265, 266, 267, 308, 309

[56] References Cited

U.S. PATENT DOCUMENTS

| | | | |
|---|---|---|---|
| 5,754,636 | 5/1998 | Bayless et al. | 379/142 |
| 5,802,526 | 9/1998 | Fawcett et al. | 379/67 |
| 5,884,032 | 3/1999 | Bateman et al. | 379/265 |
| 5,946,381 | 8/1999 | Danne et al. | 379/142 |
| 6,014,379 | 1/2000 | White et al. | 379/90.01 |

*Primary Examiner*—Scott L. Weaver
*Attorney, Agent, or Firm*—Antonelli, Terry, Stout & Kraus, LLP

[57] ABSTRACT

A telephone number/Web page look-up apparatus may be implemented in a telephone answering apparatus (15) for answering telephone calls to telephone numbers for which telephone calls are being answered by the telephone answering apparatus. The telephone answering apparatus includes a storage device (16) which stores information linking at least one of the telephone numbers for which telephone calls are being answered by the telephone answering apparatus to a uniform resource locator (URL) identifying a page on the World Wide Web (Web page) associated with the telephone number, a look-up device (18) which looks up the telephone number of each telephone call answered by the telephone answering apparatus in the storage device and, if the telephone number is found in the storage device, retrieves the URL identifying the Web page associated with the telephone number from the storage device, a display (12), and a Web page display device (18) which displays on the display the Web page associated with the telephone number of the telephone call answered by the telephone answering apparatus in response to the URL retrieved from the storage device.

63 Claims, 6 Drawing Sheets

FIG. 3

CLIENT DATA FILE

CLIENT NUMBER
CLIENT NAME
CLIENT ANSWER PHRASE
AUTO-POP URL
ADDITIONAL URLS

—17

FIG. 6
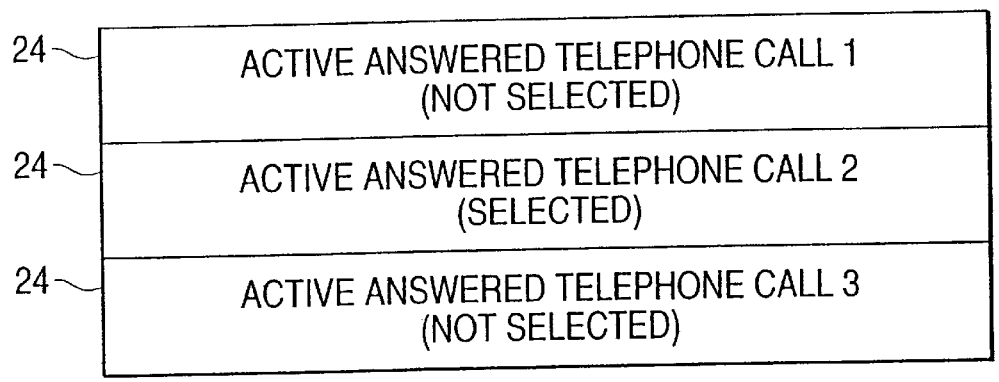
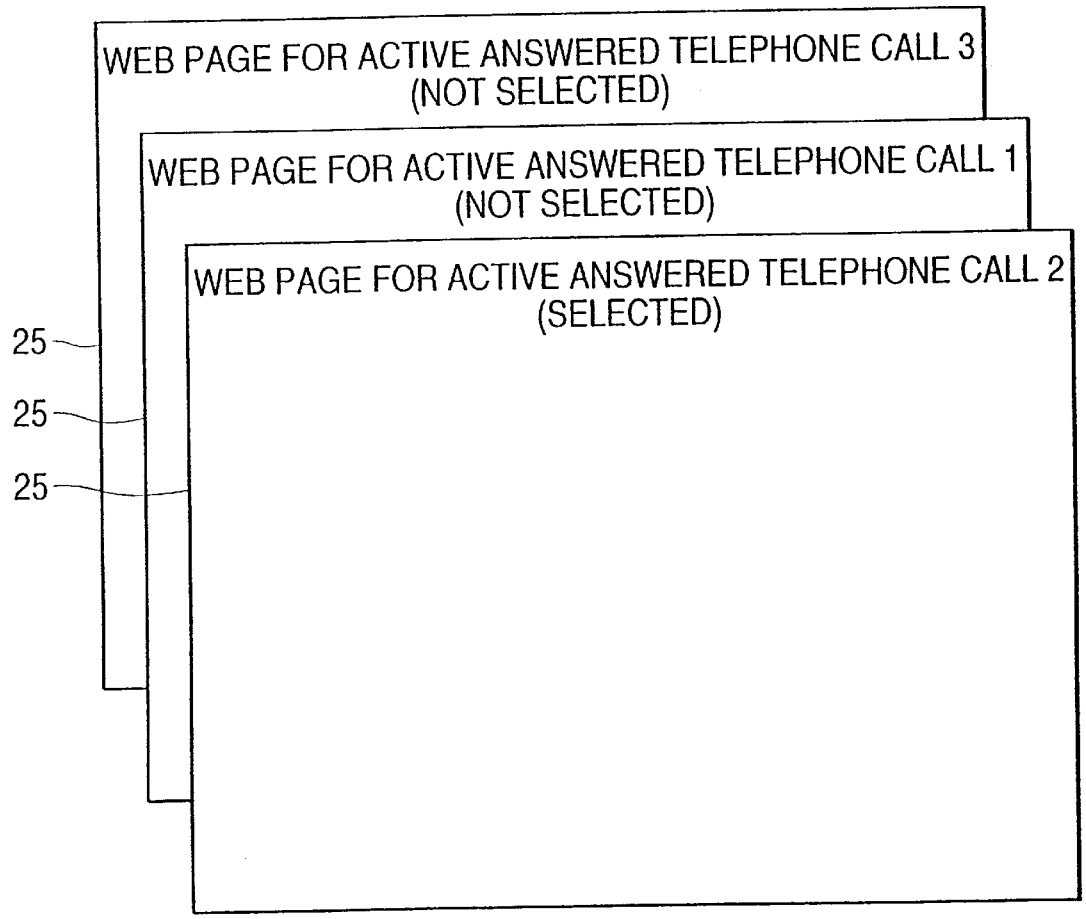

TELEPHONE NUMBER/WEB PAGE LOOK-UP APPARATUS AND METHOD

TECHNICAL FIELD

The present invention relates to a telephone number/Web page look-up apparatus and method. A telephone number/Web page look-up apparatus according to the present invention may be implemented in a telephone answering apparatus including a Web-enabled terminal which automatically displays a Web page (a page on the World Wide Web) associated with a telephone number for which telephone calls are being answered by the telephone answering apparatus when a user answers a telephone call to the telephone number using the Web-enabled terminal.

BACKGROUND ART

Telephone answering apparatuses are well known in the art. Typical applications of telephone answering apparatuses are in telephone answering services, call centers, and desktop applications.

A telephone answering service using a telephone answering apparatus typically answers telephone calls for clients it services. Telephone calls to clients' telephone numbers are redirected to the telephone answering service where they are answered by operators of a telephone answering apparatus in a manner specified by the clients, which may be intended to give the impression that the telephone calls are being answered by the clients themselves. The telephone answering apparatus typically provides the operators with the capability to record text messages from callers which the operators later read back to the clients, to forward telephone calls to a voice mail system from which the clients later retrieve messages from callers, and, if applicable, to provide other telephone call processing operations specified by the clients, such as taking orders from callers for products and services offered by the clients. The telephone answering apparatus also typically includes an auto attendant which automatically answers telephone calls without requiring an operator's attention for clients who have selected this option. The auto attendant typically uses interactive voice response techniques to enable callers to use Touchtone keys to select how their telephone calls are to be processed. For example, the auto attendant may enable the callers to select to have their telephone calls transferred to another telephone number, to the voice mail system, or to an operator of the telephone answering apparatus. A typical example of a client of telephone answering service is a doctor's office for which the telephone answering service answers telephone calls outside normal business hours.

A call center using a telephone answering apparatus is similar to a telephone answering service and provides basically the same services as a telephone answering service, except that a call center typically answers telephone calls for a single client, which typically operates the call center, while a telephone answering service typically answers telephone calls for a number of clients, none of which operate the telephone answering service. A typical example of a call center is a customer service department of a business.

A desktop application using a telephone answering apparatus is typically implemented on a PC (personal computer) or a workstation used by an individual user, and enables the individual user to answer and process his telephone calls in basically the same manner as a telephone answering service. In this case, the individual user is the client. Typical environments for desktop applications using a telephone answering apparatus include a business environment, a SOHO (small office home office) environment, and a home or personal use environment.

The term "client" in the present application means any entity whose telephone calls are being answered by a telephone answering apparatus, such as a business, a specific department of a business, or an individual user.

The term "user" in the present application means any person who uses a terminal to answer telephone calls to telephone numbers for which telephone calls are being answered by a telephone answering apparatus, such as an operator in a telephone answering service, an operator in a call center, or an individual user.

The term "terminal" in the present application means any device which is used by a user to answer telephone calls to telephone numbers for which telephone calls are being answered by a telephone answering apparatus, such as an operator station of a telephone answering service, an operator station of a call center, or a personal computer or a workstation used by an individual user.

FIG. 1 shows a conceptual diagram of an example of a prior-art telephone answering apparatus 1 which includes a telephony interface 4, an auto attendant 5, a voice mail system 6, a text message system 7, a client database 8 storing client data files 9, a terminal 10, an audio headset 11, a display 12, a keyboard 13, and a mouse 14.

Although FIG. 1 shows a mouse 14, which is a conventional example of a pointing device, it will be apparent to one of ordinary skill in the art that any other conventional pointing device may be used in place of mouse 14.

Although FIG. 1 shows a single terminal 10, a plurality of terminals may be provided when necessary, such as in a telephone answering service which answers telephone calls for a number of clients, or in a call center which answers telephone calls for a large client.

Telephony interface 4 is operatively connected by telephone line(s) 3 to a telco (telephone company) 2, such as a public or private switched telephone network.

Auto attendant 5 is operatively connected to telephony interface 4, voice mail system 6, and terminal 10, and automatically answers telephone calls without requiring a user's attention for clients who have selected this option. Auto attendant 5 uses interactive voice response techniques to enable callers to use Touchtone keys to select how their telephone calls are to be processed. For example, auto attendant 5 may enable the callers to select to have their telephone calls transferred to another telephone number, to voice mail system 6, or to terminal 10 for answering by a user.

Terminal 10 is operatively connected to telephony interface 4, auto attendant 5, voice mail system 6, text message system 7, client database 8, audio headset 11, display 12, keyboard 13, and mouse 14, and enables a user to use audio headset 11, display 12, keyboard 13, and mouse 14 to answer and process telephone calls for clients received from telco 2 over telephone line(s) 3. The telephone calls may arrive at terminal 10 directly from telephony interface 4, or indirectly from telephony interface 4 via auto attendant 5. Terminal 10 enables the user to take messages from callers using audio headset 11 and record the messages using display 12, keyboard 13, and mouse 14 for storage in text message system 7, or to forward telephone calls to voice mail system 6 at the callers' request. If applicable, terminal 10 also enables the user to provide other telephone call processing operations specified by the clients using audio headset 11, display 12, keyboard 13, and mouse 14 as necessary, such as taking orders from callers for products and services offered by the clients.

Client database 8 stores a client data file 9 for each client whose telephone calls are being answered by prior-art telephone answering apparatus 1. Client data file 9 includes data items which provide information identifying the client and specifying how the client's telephone calls are to be answered and processed. These data items are well known in the art. Auto attendant 5 and the user of terminal 10 answer telephone calls for the client based on the data items in client data file 9, which include a data item specifying whether telephone calls for the client are to be answered initially by auto attendant 5 or by the user of terminal 9. Such a data item is well known in the art.

It is noted that the connections between the elements of prior-art telephone answering apparatus 1 shown in FIG. 1 are conceptual connections, and do not necessarily represent actual physical connections. As will be apparent to one of ordinary skill in the art, the conceptual connections shown in FIG. 1 may be implemented with many different actual physical connections, which may include direct-wired connections, bus connections, network connections, and any other connections which are known in the art.

Furthermore, it is noted that prior-art telephone answering apparatus 1 shown in FIG. 1 is merely exemplary, and many modifications of prior-art telephone answering apparatus 1 will be apparent to one of ordinary skill in the art.

Examples of prior-art telephone answering apparatus 1 shown in FIG. 1 are disclosed in U.S. Pat. Nos. 4,916,726, 5,113,429, 5,259,024, 5,420,852, and 5,469,491 and U.S. Reexamination Certificate B1 4,916,726 which are assigned to the assignee of the present application. The contents of U.S. Pat. Nos. 4,916,726, 5,113,429, 5,259,024, 5,420,852, and 5,469,491 and U.S. Reexamination Certificate B1 4,916,726 are incorporated herein by reference in their entirety.

U.S. Pat. Nos. 4,916,726 and 5,420,852 each include a microfiche appendix listing a computer program for implementing an embodiment of prior-art telephone answering apparatus shown in FIG. 1 using IBM AT-compatible PCs.

An example of a device which may be used to implement telephony interface 4, auto attendant 5, text message system 6, voice mail system 7, and client database 8 of prior-art telephone answering apparatus 1 shown in FIG. 1 is the commercially available Amtelco Infinity CTI (computer-telephony integration) server, version 4.4.0j, which was available from American Tel-A-System, Inc. (Amtelco), McFarland, Wis., the assignee of the present invention, as of the filing date of the present application. The Amtelco Infinity CTI server is based on an IBM AT-compatible PC.

An example of a device which may be used to implement terminal 10 of prior-art telephone answering apparatus 1 shown in FIG. 1 is a commercially available IBM AT-compatible PC running an Amtelco DOS (disk operating system) terminal application program which was available from Amtelco as of the filing date of the present application for use with the Amtelco Infinity CTI server.

Although specific capabilities and applications of telephone answering apparatuses have been described above, it is noted that other capabilities and applications of telephone answering apparatuses are well known in the art, and that further capabilities and applications of telephone answering apparatuses will be apparent to one of ordinary skill in the art.

Over the past several years, the use of the Internet and the World Wide Web by organizations and individuals has increased dramatically, and is continuing to increase at a rapid rate.

Many organizations, such as businesses, not-for-profit organizations, educational institutions, and governmental agencies, have implemented sites on the World Wide Web (Web sites) including one or more pages (Web pages) which provide information about the organizations and products and services they offer.

These Web sites may enable individuals to interact with the organizations, such as by ordering products and services directly from the organizations via the Web sites.

Also, many individuals have implemented Web sites including one or more Web pages which provide information about themselves and topics they are interested in.

As is well known in the art, Web sites may also be implemented on an intranet, which is basically similar to the Internet, except that an intranet is typically implemented by an organization or individual primarily for exclusive use by that organization or individual. However, the organization or individual may also permit outsiders to use its intranet.

Web pages may include many different types of information which are well known in the art, such as HTML (hypertext markup language) documents, Java scripts, and ActiveX scripts.

Web pages are identified by a unique Internet or intranet address known as a URL (universal resource locator), which is well known in the art. A Web page may be displayed on a display of a PC using a software application known as a Web browser running on the PC by entering the URL of the Web page in a URL field in a screen displayed by the Web browser. Many different Web browsers are well known in the art.

The information available on Internet and intranet Web sites that have been implemented by organizations and individuals can only be accessed by individuals who have access to the Internet. Although the number of individuals who have access to the Internet has increased dramatically over the past several years, there are still many individuals who do not have access to the Internet. Furthermore, even though an individual may have access to the Internet, he may not be aware that a particular organization or individual he is interested in contacting or learning more about has implemented an Internet or intranet Web site, or he may not be permitted to access a particular intranet Web site he is interested in.

Many organizations and individuals which have implemented Web sites also use telephone answering apparatuses, either directly, such as in call centers which they operate or desktop applications they use, or indirectly, such as in telephone answering services of which they are clients.

It would be desirable if a terminal in a telephone answering apparatus could automatically display a Web page from a client's Web site when a user answers a telephone call for the client, and provide the user with the capability of navigating through the Web site while processing the telephone call. This would enable the user to quickly provide information available on the client's Web site to the caller. However, prior-art telephone answering apparatuses do not have this capability.

The article "MULTI CALL: WebCall—a real Virtual Call Centre", *M2 Presswire*, Nov. 27, 1995, describes WebCall, a virtual call center which provides Web pages which a customer can access with a Web browser. If the customer requires support while browsing the virtual call center Web pages, he can click on an embedded telephone graphic, which will cause WebCall to place locate and place a telephone call to a dedicated or virtual agent who has the necessary skill set, compatible with the customer's known or assumed characteristics, and transfer the telephone call and the relevant Web page to the agent's desktop. However, in this case, the Web page which is displayed on the agent's desktop when the agent answers the customer's telephone call was selected by the customer, rather than being automatically displayed in response to the customer's telephone call. Thus, the *M2 Presswire* reference does not disclose automatically displaying one of the virtual call center Web pages when an agent answers a telephone call from customer calling the virtual call center.

U.S. Pat. No. 5,793,861 to Haigh discloses a transaction processing system and method which includes a telephone answering apparatus, and has the capability of receiving data transmissions from the Internet and the World Wide Web and identifying and storing Internet addresses of the received data transmissions. However, Haigh does not disclose automatically displaying a Web page from a client's Web site when a user of the telephone answering apparatus answers a telephone call for the client.

U.S. Pat. No. 5,724,412 to Srinivasan discloses a method and system for providing a telephony subscriber with Internet information related to a caller calling the subscriber. In one of the embodiments disclosed by Srinivasan, a Web page related to a caller is automatically displayed on the subscriber's equipment when the caller calls the subscriber. However, Srinivasan does not disclose automatically displaying a Web page of the subscriber when a caller calls the subscriber.

Thus, the *M2 Presswire* reference, Haigh, and Srinivasan do not disclose a telephone answering apparatus which automatically displays a Web page from a client's Web site when a user answers a telephone call for the client.

DISCLOSURE OF INVENTION

The present invention provides a telephone answering apparatus including a Web-enabled terminal having a telephone number/Web page look-up feature and a Web browser feature which enable the Web-enabled terminal to automatically display a Web page from a client's Web site when a user answers a telephone call for the client using the Web-enabled terminal.

Stated in another way, the present invention provides a telephone answering apparatus including a Web-enabled terminal which automatically displays a Web page (a page on the World Wide Web) associated with a telephone number for which telephone calls are being answered by the telephone answering apparatus when a user answers a telephone call to the telephone number using the Web-enabled terminal.

According to the present invention, a telephone answering apparatus for answering telephone calls to telephone numbers for which telephone calls are being answered by the telephone answering apparatus includes a storage device which stores information linking at least one of the telephone numbers for which telephone calls are being answered by the telephone answering apparatus to a uniform resource locator (URL) identifying a page on the World Wide Web (Web page) associated with the telephone number, a look-up device which looks up the telephone number of each telephone call answered by the telephone answering apparatus in the storage device and, if the telephone number is found in the storage device, retrieves the URL identifying the Web page associated with the telephone number from the storage device, a display, and a Web page display device which displays on the display the Web page associated with the telephone number of the telephone call answered by the telephone answering apparatus in response to the URL retrieved from the storage device.

BRIEF DESCRIPTION OF DRAWINGS

FIG. 3 shows a conceptual example of the format of a client data file stored in a client database in the telephone answering apparatus according to the present invention shown in FIG. 2.

FIG. 6 shows a conceptual diagram wherein three telephone calls which have been answered by a user using the Web-enabled terminal according to the present invention shown in FIG. 2 are active simultaneously, and three copies of a Web browser corresponding to the three active answered telephone calls which have been opened by the Web-enabled terminal are displaying Web pages associated with the telephone numbers of the three active answered telephone calls.

BEST MODE FOR CARRYING OUT THE INVENTION

Figure 2:
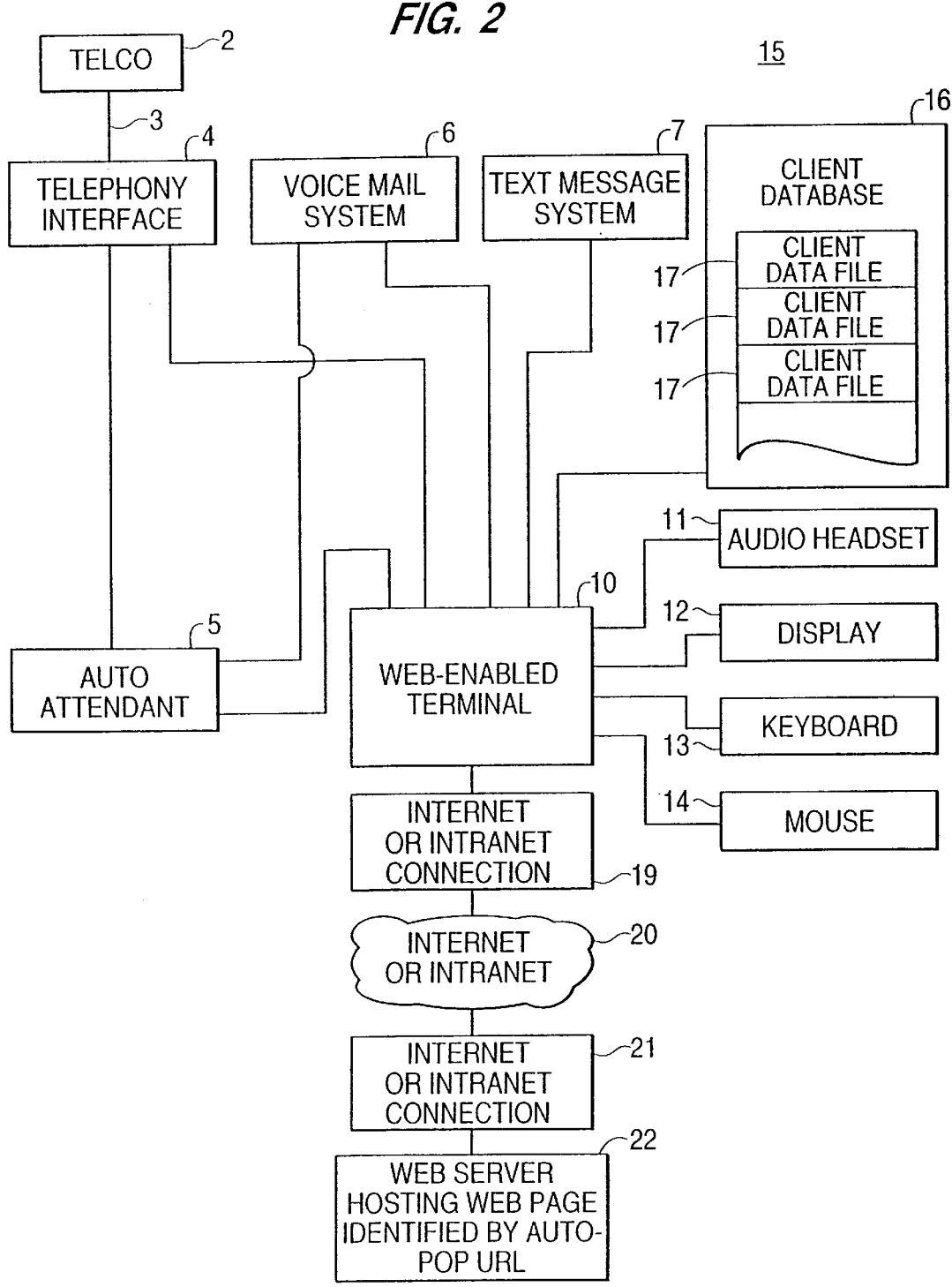
FIG. 2 shows a conceptual diagram of an example of a telephone answering apparatus according to the present invention including a Web-enabled terminal which a user uses to answer telephone calls for a client.

FIG. 2 shows a conceptual diagram of an example of a telephone answering apparatus 15 according to the present invention which includes a telephony interface 4, an auto attendant 5, a voice mail system 6, a text message system 7, a client database 16 storing client data files 17, a Web-enabled terminal 18, an audio headset 11, a display 12, a keyboard 13, a mouse 14, and an Internet or intranet connection 19 connected to the Internet or an intranet 20. Many different connections suitable for use as Internet or intranet connection 19 are well known in the art.

Although FIG. 2 shows a mouse 14, which is a conventional example of a pointing device, it will be apparent to one of ordinary skill in the art that any other conventional pointing device may be used in place of mouse 14.

Although FIG. 2 shows a single Web-enabled terminal 18, a plurality of Web-enabled terminals may be provided when necessary, such as in a telephone answering service which answers telephone calls for a number of clients, or in a call center which answers telephone calls for a large client.

Telephony interface 4 is operatively connected by telephone line(s) 3 to a telco (telephone company) 2, such as a public or private switched telephone network.

Auto attendant 5 is operatively connected to telephony interface 4, voice mail system 6, and Web-enabled terminal 18, and automatically answers telephone calls without requiring a user's attention for clients who have selected this option. Auto attendant 5 uses interactive voice response techniques to enable callers to use Touchtone keys to select how their telephone calls are to be processed. For example, auto attendant 5 may enable the callers to select to have their telephone calls transferred to another telephone number, to voice mail system 6, or to Web-enabled terminal 18 for answering by a user.

Web-enabled terminal 18 is operatively connected to telephony interface 4, auto attendant 5, voice mail system 6, text message system 7, client database 16, audio headset 11, display 12, keyboard 13, mouse 14, and Internet or intranet connection 19, and enables a user to use audio headset 11, display 12, keyboard 13, and mouse 14 to answer and process telephone calls for clients received from telco 2 over telephone line(s) 3. The telephone calls may arrive at Web-enabled terminal 18 directly from telephony interface 4, or indirectly from telephony interface 4 via auto attendant 5. Web-enabled terminal 18 enables the user to take messages from callers using audio headset 11 and record the messages using display 12, keyboard 13, and mouse 14 for storage in text message system 7, or to forward telephone calls to voice mail system 6 at the callers' request. If applicable, Web-enabled terminal 18 also enables the user to provide other telephone call processing operations specified by the clients using audio headset 11, display 12, keyboard 13, and mouse 14 as necessary, such as taking orders from callers for products and services offered by the clients.

Figure 1:
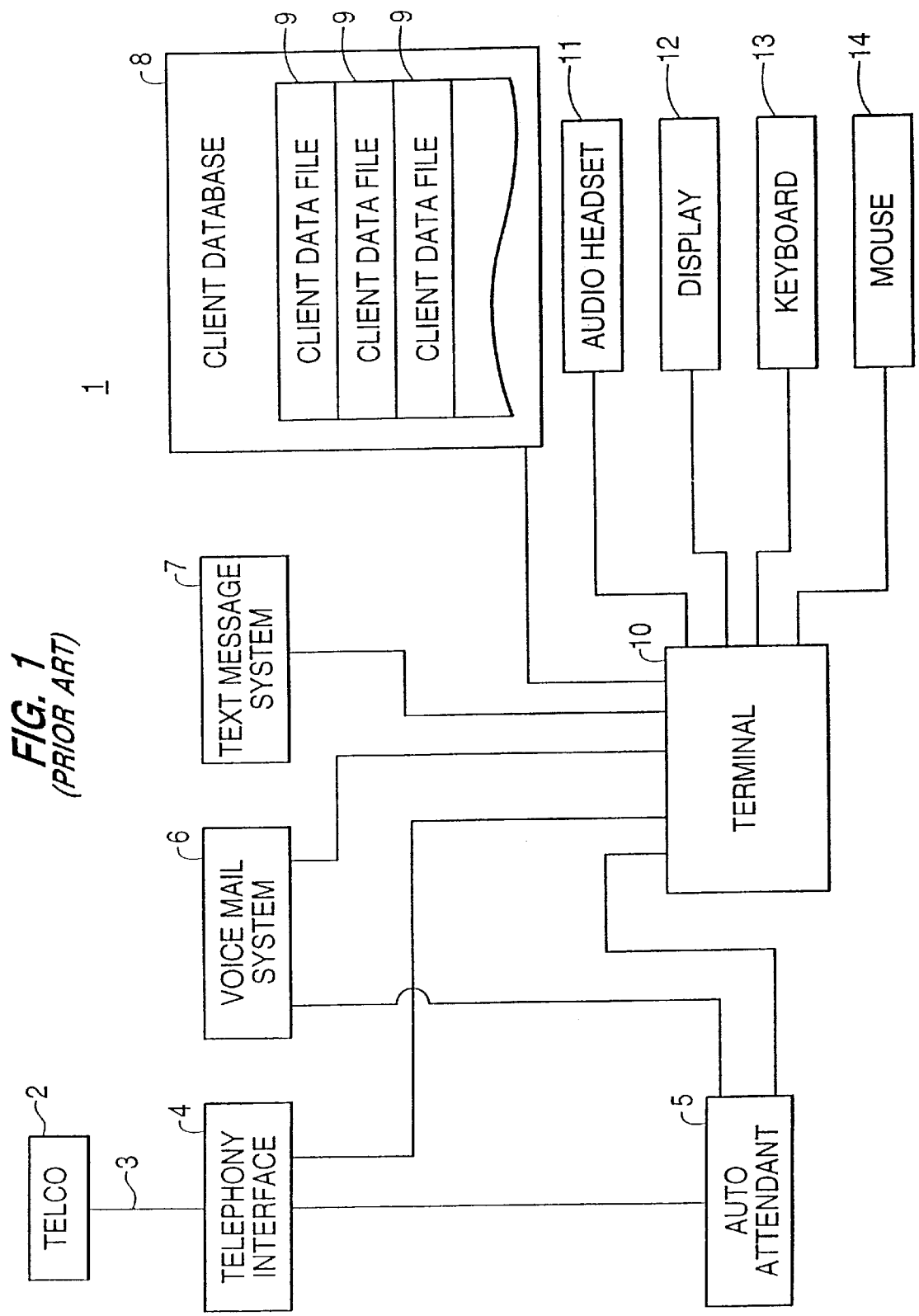
FIG. 1 shows a conceptual diagram of an example of a prior-art telephone answering apparatus.

The basic telephone call answering and processing capabilities provided by Web-enabled terminal 18 according to the present invention are the same as those provided by terminal 9 in prior-art telephone answering apparatus 1 shown in FIG. 1. However, as will be discussed in detail below, Web-enabled terminal 18 according to the present invention also has a telephone number/Web page look-up feature and a Web browser feature wherein Web-enabled terminal 18 automatically displays a Web page from a client's Web site when a user answers a telephone call for the client, and provides the user with the capability of navigating through the client's Web site while processing the telephone call. Terminal 9 in prior-art telephone answering apparatus 1 shown in FIG. 1 does not have the telephone number/Web page look-up feature or the Web browser feature of Web-enabled terminal 18 according to the present invention.

Client database 16 stores a client data file 17 for each client whose telephone calls are being answered by telephone answering apparatus 15. Client data file 17 according to the present invention includes data items which provide information identifying the client and specifying how the client's telephone calls are to be answered and processed. Many of these data items are the same as the data items in client data file 9 in client database 8 in prior-art telephone answering apparatus 1 shown in FIG. 1, and are well known in the art. However, as will be discussed in detail below, client data file 17 according to the present invention also includes certain data items which are not known in the prior art, but which are part of the present invention. Auto attendant 5 and the user of Web-enabled terminal 18 answer telephone calls for the client based on the data items in client data file 17, which include a data item specifying whether telephone calls for the client are to be answered initially by auto attendant 5 or by the user of Web-enabled terminal 18. Such a data item is well known in the art.

FIG. 3 shows a conceptual example of the format of a client data file 17 in client database 16 which includes the following data items:

Client Number—The telephone number of a client for which telephone calls are to be answered by telephone answering apparatus 15.

Client Name—The name of the client whose telephone calls are to be answered by telephone answering apparatus 15.

Client Answer Phrase—An answer phrase which a user of Web-enabled terminal 18 is to speak when answering a telephone call for the client.

Auto-pop URL—A URL (universal resource locator) identifying a Web page which is to be automatically displayed on display 12 by Web-enabled terminal 18 when the user of Web-enabled terminal 18 answers a telephone call for the client.

Additional URLs—URLs identifying additional Web pages which may be displayed on display 12 by Web-enabled terminal 18 at the request of the user of Web-enabled terminal 18 while the user is processing a telephone call for the client.

The client name, the client number, and the client answer phrase in client data file 17 in client database 16 according to the present invention are well known in the art, and are also included in client data file 9 in client database 8 in prior-art telephone answering apparatus 1 shown in FIG. 1. The auto-pop URL and the additional URLs in client data file 17 in client database 16 according to the present invention are part of the present invention, and are not included in client data file 9 in client database 8 in prior-art telephone answering apparatus 1 shown in FIG. 1.

Although FIG. 3 shows only five data items in client data file 17, it will be apparent to one of ordinary skill in the art that client data file 17 may include additional data items which are well known in the art and which provide additional information specifying how the client's telephone calls are to be answered and processed.

Referring again to FIG. 2, the auto-pop URL in client data file 17 identifies a Web page which is hosted by a Web server 22 which is operatively connected to Internet or intranet 20 via an Internet or intranet connection 21. Although the Web page identified by the auto-pop URL is described in the present application as being a Web page from a client's Web site, it may be any Web page which the client wants to be displayed to a user of Web-enabled terminal 18 when the user answers a telephone call for the client. Although FIG. 2 only shows one Web server 22 connected to Internet or intranet 20, it will be apparent to one of ordinary skill in the art that many such Web servers are in fact connected to the Internet, and may be connected to an intranet. The additional URLs in client data file 17 identify Web pages which are hosted by Web server 22 and/or other such Web servers connected to Internet or intranet 20.

When a user of Web-enabled terminal 18 answers a telephone call for a client, Web-enabled terminal 18 retrieves the client name, the client answer phrase, and the auto-pop URL from the client data file 17 for the client in client database 16, retrieves the Web page identified by the auto-pop URL from Web server 22 via Internet or intranet connection 19, Internet or intranet 20, and Internet or intranet connection 21, and displays the client name, the client answer phrase, and the Web page on display 12 for viewing by the user. This process is described below in greater detail with reference to FIG. 5.

Figure 4:
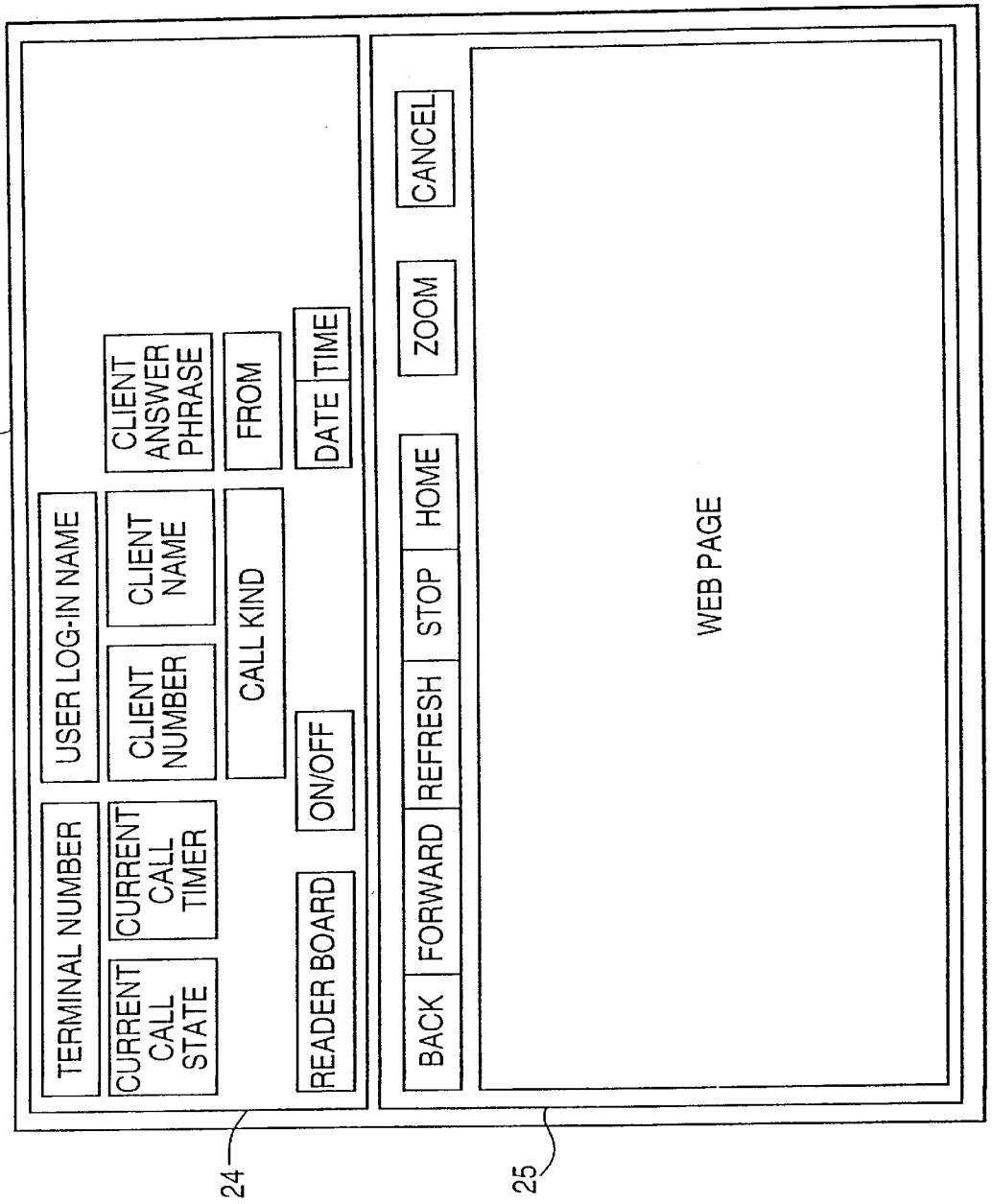
FIG. 4 shows a conceptual example of a Web browser screen which is displayed by the Web-enabled terminal according to the present invention shown in FIG. 2 when a user answers a telephone call for a client using the Web-enabled terminal.

FIG. 4 shows a conceptual example of a Web browser screen 23 which Web-enabled terminal 18 displays on display 12. Web browser screen 23 includes a telephone toolbar 24 and a Web browser 25.

An incoming telephone call is displayed to the user of Web-enabled terminal 18 on telephone toolbar 24. The user can answer the telephone call and perform all telephone call processing functions, such as dialing, paging, transferring, conferencing, patching, and accessing voice mail system 6, using telephone toolbar 24, keyboard 13, and mouse 14. These telephone call processing functions are well known in the art.

Although Web browser screen 23 shown in FIG. 4 includes both telephone toolbar 24 and Web browser 25, telephone toolbar 24 and Web browser 25 operate independently of one another. Telephone toolbar 24 remains active even if the user is working in another application running on Web-enabled terminal 18 so that the user can continue to process telephone calls using telephone toolbar 24, keyboard 13, and mouse 14 even while working in the other application.

As shown in FIG. 4, telephone toolbar 24 displays the following information:

Terminal Number—A number identifying Web-enabled terminal 18 within telephone answering apparatus 15.

User Log-In Name—The name under which the user of Web-enabled terminal 18 is logged into telephone answering apparatus 15.

Current Call State—The state of the telephone call which is currently displayed on telephone toolbar 24. Various call states are well known in the art.

Current Call Timer—Shows how long the telephone call which is currently displayed on telephone toolbar 24 has been in its current state.

Client Number—The telephone number for which the telephone call which is currently displayed on telephone toolbar 24 is being answered.

Client Name—The name of the client whose telephone call is currently displayed on telephone toolbar 24.

Client Answer Phrase—The answer phrase which the user of Web-enabled terminal 18 is to speak when answering the telephone call which is currently displayed on telephone toolbar 24.

Call Kind—The kind of the telephone call which is currently displayed on telephone toolbar 24. Various call kinds are well known in the art.

From—Information identifying the origin of the telephone call which is currently displayed on telephone toolbar 24.

Reader Board—Information about what else is happening with telephone calls in telephone answering apparatus 15.

On/Off—Indicates whether the user of Web-enabled terminal 18 is enabled to receive incoming telephone calls, where on=enabled and off=not enabled.

Date—The current date.

Time—The current time.

As shown in FIG. 4, Web browser 25 displays a Web page, and provides the following control buttons which the user of Web-enabled terminal 18 may activate using keyboard 13 and/or mouse 14:

Back—Allows the user to move back through previously visited Web pages.

Forward—Allows the user to move forward through previously visited Web pages.

Refresh—Allows the user to instruct Web browser 25 to request that the Web page which is currently being displayed be refreshed from the Web server which is hosting the Web page.

Stop—Allows the user to instruct Web browser 25 to stop requesting information for the Web page which is currently being displayed from the Web server which is hosting the Web page.

Home—Allows the user to instruct Web browser 25 to return to a home Web page specified for Web-enabled terminal 18.

Zoom—Allows the user to instruct Web browser 25 to toggle between a full screen mode in which telephone toolbar 24 is hidden, and a partial screen mode as shown in FIG. 4 in which telephone toolbar 24 is visible.

Cancel—Allows the user to close Web browser 25. Telephone toolbar 24 remains active and visible after Web browser 25 is closed.

Figure 5:
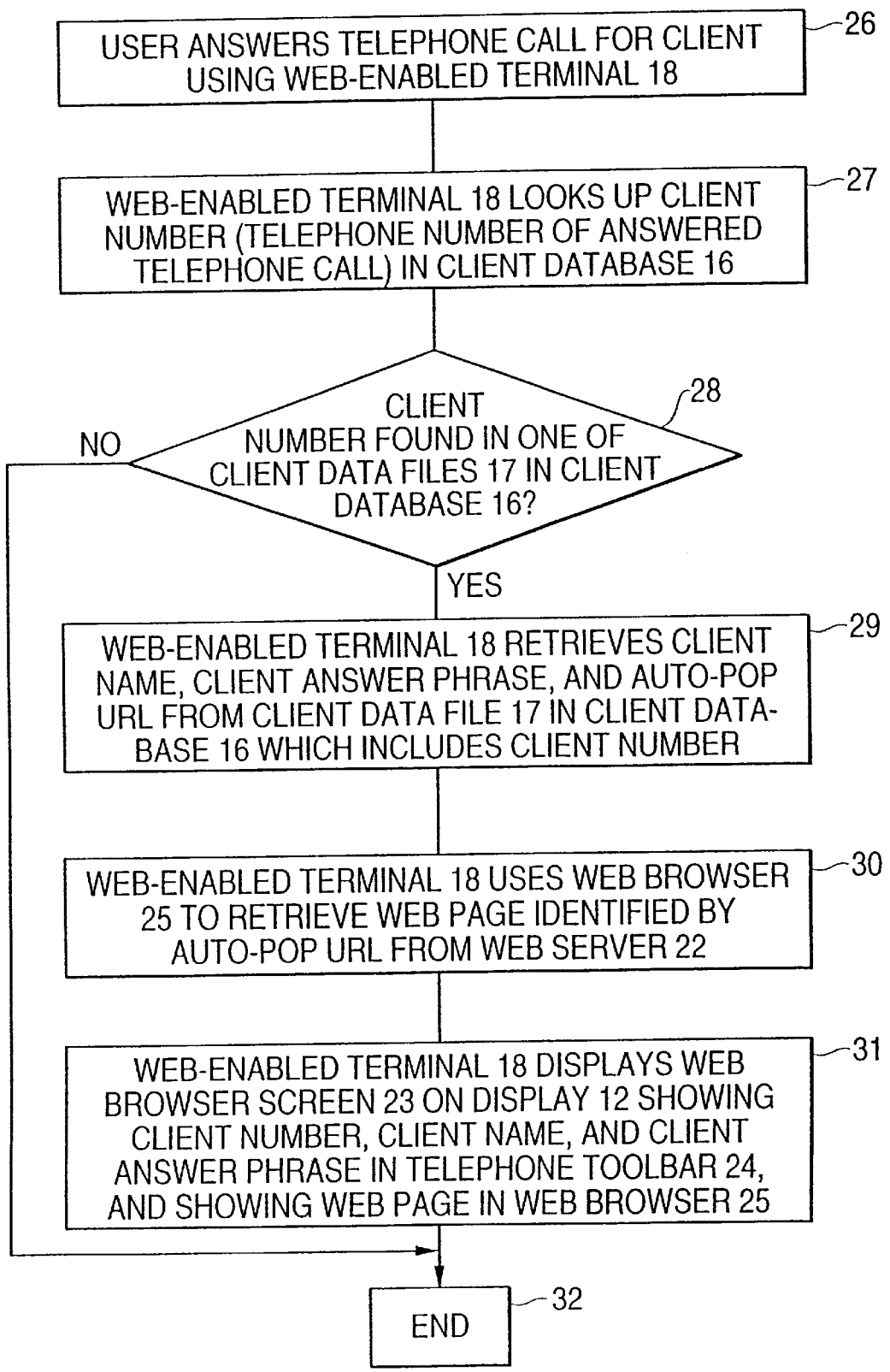
FIG. 5 shows a flow chart of a process which Web-enabled terminal according to the present invention shown in FIG. 2 performs to automatically display a Web page from a client's Web site in the Web browser screen shown in FIG. 4 when a user answers a telephone call for the client using the Web-enabled terminal.

FIG. 5 shows a flow chart of the process which Web-enabled terminal 18 performs to automatically display a Web page from a client's Web site in Web browser screen 23 when a user answers a telephone call for the client using Web-enabled terminal 18.

In step 26, a user answers a telephone call for a client using Web-enabled terminal 18. In step 27, Web-enabled terminal 18 looks up the client number in client database 16. The client number is typically the telephone number of the answered telephone call, but it may be any other number or label identifying the client, which other number or label may or may not be indicative of the telephone number of the answered telephone call. In step 28, if the client number is not found in one of client data files 17 in client database 16, the process proceeds to step 32 where it ends, while if the client number is found in one of client data files 17 in client database 16, the process proceeds to step 29. In step 29, Web-enabled terminal 18 retrieves the client name, the client answer phrase, and the auto-pop URL from the client data file 17 in client database 16 which includes the client number. In step 30, Web-enabled terminal 18 uses Web browser 25 to retrieve the Web page identified by the auto-pop URL from Web server 22 via Internet or intranet connection 19, Internet or intranet 20, and Internet or intranet connection 21. In step 31, Web-enabled terminal 18 displays Web browser screen 23 on display 12, showing the client number, the client name, and the client answer phrase in telephone toolbar 24, and showing the Web page in Web browser 25. The process then proceeds to step 32 where it ends.

After the Web page identified by the auto-pop URL has been displayed, the user may use keyboard 12 and/or mouse 13 to retrieve the additional URLs in the client data file 17 for the client in client database 16 and instruct Web browser 25 to retrieve and display the Web pages identified by the additional URLs. The user may use keyboard 13 and/or mouse 14 to specify other URLs and instruct Web browser 25 to retrieve and display Web pages identified by the other URLs. The user may use mouse 14 to click on any hyperlinks in any Web page which is currently being displayed by Web browser 25 to instruct Web browser 25 to retrieve and display other Web pages identified by the hyperlinks. The user may use keyboard 13 and/or mouse 14 to activate the Web browser control buttons shown in FIG. 4 to navigate through previously visited Web sites. The user may use keyboard 13 and/or mouse 14 to enter information into any form which may appear on any Web page which is currently being displayed by Web browser 25.

Web-enabled terminal 18 allows the user to open Web browser 25 on demand by using keyboard 13 and/or mouse 14, which allows the user to access Web pages even if the user is not currently processing a telephone call, or if the telephone number for which the user is currently processing a telephone call does not have any Web pages associated with it, as would be the case if client data file 17 for the client for which the user is currently processing a telephone call does not include either an auto-pop URL or additional URLs.

Web-enabled terminal 18 enables the user to dial telephone numbers using a dial request function to initiate outgoing telephone calls, and enables the user to use the same dial request function to instruct Web browser 25 to retrieve and display a specific Web page by inputting the URL of the Web page as a URL dial string having the following format:

"www.world-wide-web-address.com"U

The URL of the Web page is inside the quotation marks, and the "U" identifies the dial string as a URL dial string. The auto-pop URL and the additional URLs in client data file 17 are stored in this format.

Web-enabled terminal 18 enables a plurality of telephone calls answered by the user to be active simultaneously, and enables the user to move between the active answered telephone calls with a single command from keyboard 13 or mouse 14 to select one of the active answered telephone calls for processing. The single command may be a single keystroke on keyboard 13 or a single operation of mouse 14.

Each time the user of Web-enabled terminal 18 answers a telephone call while one or more other answered telephone calls are still active and the newly answered telephone call is to a telephone number having a Web page associated therewith, Web-enabled terminal 18 opens a new copy of Web browser 25 corresponding to the newly answered telephone call, and the newly opened copy of Web browser 25 displays the Web page associated with the telephone number of the newly answered telephone call.

As the user moves between the active answered telephone calls to select one of the active answered telephone calls for processing, Web-enabled terminal 18 displays the copy of Web browser 25 which is displaying the Web page associated with the telephone number of the active answered telephone call which the user has selected for processing.

FIG. 6 shows a conceptual diagram wherein three telephone calls which have been answered by the user of Web-enabled terminal 18 are active simultaneously, and three copies of Web browser 25 corresponding to the three active answered telephone calls which have been opened by Web-enabled terminal 18 are displaying Web pages associated with the telephone numbers of the three active answered telephone calls. Active answered telephone call 1 has been selected for processing, so the copy of Web browser 25 corresponding to active answered telephone call 2 which has been selected for processing is displayed on top of the copies of Web browser 25 corresponding to active answered telephone calls 1 and 3 which have not been selected for processing, such that only the copy of Web browser 25 corresponding to active answered telephone call 2 which has been selected for processing is visible.

Web-enabled terminal 18 has a Web browser data exchange feature which enables it to pass data about the telephone call which is currently being displayed on telephone toolbar 24 to Web browser 25. Such data may be required by the Web page currently being displayed by Web browser 25, and may include the following data items, some of which were described above with reference to FIG. 4:

User Log-In Name—The name under which the user of Web-enabled terminal 18 is logged into telephone answering apparatus 15.

User Initials—The initials of the user of Web-enabled terminal 18.

Terminal Number—A number identifying Web-enabled terminal 18 within telephone answering apparatus 15.

Client Number—The telephone number for which the telephone call which is currently displayed on telephone toolbar 24 is being answered.

Client Name—The name of the client whose telephone call is currently displayed on telephone toolbar 24.

Automatic Number Identification—The telephone number of the caller who made the telephone call which is currently displayed on telephone toolbar 24, obtained by an automatic number identification service such as Caller ID.

Call Kind—The kind of the telephone call which is currently displayed on telephone toolbar 24. Various call kinds are well known in the art.

Date—The current date.

Time—The current time.

If necessary, Web-enabled terminal 18 may also pass other data about the telephone call which is currently being displayed on telephone toolbar 24 to Web browser 25.

It is noted that the connections between the elements of telephone answering apparatus 15 shown in FIG. 2 are conceptual connections, and do not necessarily represent actual physical connections. As will be apparent to one of ordinary skill in the art, the conceptual connections shown in FIG. 2 may be implemented with many different actual physical connections, which may include direct-wired connections, bus connections, network connections, and any other connections which are known in the art.

Furthermore, it is noted that telephone answering apparatus 15 shown in FIG. 2 is merely exemplary, and many modifications of telephone answering apparatus 15 will be apparent to one of ordinary skill in the art.

Examples of devices which may be used to implement telephony interface 4, auto attendant 5, text message system 6, voice mail system 7, and client database 16 of telephone answering apparatus 15 according to the present invention shown in FIG. 2 are disclosed in U.S. Pat. Nos. 4,916,726, 5,113,429, 5,259,024, 5,420,852, and 5,469,491 and U.S. Reexamination Certificate B1 4,916,726 discussed above in the Background Art section of the present application.

U.S. Pat. Nos. 4,916,726 and 5,420,852 each include a microfiche appendix listing a computer program which may be used to implement telephony interface 4, auto attendant 5, text message system 6, voice mail system 7, and client database 16 of telephone answering apparatus 15 according to the present invention shown in FIG. 2 using IBM AT-compatible PCs.

It is noted that the auto-pop URL and the additional URLs in client data file 17 in client database 16 of telephone answering apparatus 15 according to the present invention shown in FIG. 2 are part of the present invention, and are not disclosed in U.S. Pat. Nos. 4,916,726, 5,113,429, 5,259,024, 5,420,852, and 5,469,491 and U.S. Reexamination Certificate B1 4,916,726. However, U.S. Pat. Nos. 4,916,726, 5,113,429, 5,259,024, 5,420,852, and 5,469,491 and U.S. Reexamination Certificate B1 4,916,726 disclose a client database storing client data files which corresponds to client database 8 storing client data files 9 in prior-art telephone answering apparatus 1 shown in FIG. 1, and one of ordinary skill in the art would be able to modify the client data files disclosed in U.S. Pat. Nos. 4,916,726, 5,113,429, 5,259,024, 5,420,852, and 5,469,491 and U.S. Reexamination Certificate B1 4,916,726 to include the auto-pop URL and the additional URLs of the present invention.

An example of a device which may be used to implement telephony interface 4, auto attendant 5, text message system 6, voice mail system 7, and client database 16 of telephone answering apparatus 15 according to the present invention shown in FIG. 2 is the commercially available Amtelco Infinity CTI server which was discussed above in the Background Art section of the present application.

It is noted that the auto-pop URL and the additional URLs in client data file 17 in client database 16 of telephone answering apparatus 15 according to the present invention shown in FIG. 2 are part of the present invention, and are not present in the Amtelco Infinity CTI server. However, the Amtelco Infinity CTI server includes a client database storing client data files which corresponds to client database 8 storing client data files 9 in prior-art telephone answering apparatus 1 shown in FIG. 1, and one of ordinary skill in the art would be able to modify the client data files of the Amtelco Infinity CTI server to include the auto-pop URL and the additional URLs of the present invention.

Alternatively, telephony interface 4 of telephone answering apparatus 15 according to the present invention shown in FIG. 2 may be implemented by a conventional TAPI (telephone application programming interface)-compliant telephony interface, such as a TAPI-compliant PBX (private branch exchange). Many such TAPI-compliant telephony interfaces are well known in the art.

If telephony interface 4 of telephone answering apparatus 15 according to the present invention shown in FIG. 2 is implemented by a TAPI-compliant telephony interface as discussed above, auto attendant 5, text message system 6, voice mail system 7, and client database 16 of telephone answering apparatus 15 according to the present invention shown in FIG. 2 may be implemented by the Amtelco Infinity CTI server. In this embodiment, the telephony interface functions of the Amtelco Infinity CTI server would not be used because the TAPI-compliant telephony interface would provide the necessary telephony interface functions.

Alternatively, if telephony interface 4 of telephone answering apparatus 15 according to the present invention shown in FIG. 2 is implemented by a TAPI-compliant telephony interface as discussed above, auto attendant 5, text message system 6, voice mail system 7, and client database 16 of telephone answering apparatus 15 according to the present invention shown in FIG. 2 may be implemented by devices which are disclosed in U.S. Pat. Nos. 4,916,726, 5,113,429, 5,259,024, 5,420,852, and 5,469,491 and U.S. Reexamination Certificate B1 4,916,726 as discussed above.

An example of a device which may be used to implement the telephone number/Web page look-up feature, the Web page display feature, and the Web browser data exchange feature of Web-enabled terminal 18 of telephone answering apparatus 15 according to the present invention shown in FIG. 2 is a commercially available IBM AT-compatible PC running the computer program listed below at the end of the specification before the claims. This computer program is not known in the art, but was developed by the applicants to implement the present invention. However, this computer program is merely exemplary, and one of ordinary skill in the art would be able to write a computer program to implement the telephone number/Web page look-up feature, the Web page display feature, and the Web browser data exchange feature of Web-enabled terminal 18 according to the present invention based on the description of these features set forth above using standard computer programming techniques which are well known in the art.

A computer program for implementing the telephone number/Web page look-up feature, the Web page display feature, and the Web browser data exchange feature of Web-enabled terminal 18 according to the present invention, such as the computer program listed below, may be stored in any suitable processor-readable medium which is known in the art, such as a CD-ROM, a floppy disk(s), a hard drive, DAT, ROM, RAM, etc. When the computer program is read from the processor-readable medium and is executed by a processor, such a microprocessor in an IBM AT-compatible PC, it causes the processor to perform the steps necessary to provide the telephone number/Web page look-up feature, the Web page display feature, and the Web browser data exchange feature of Web-enabled terminal 18 according to the present invention.

As discussed above, the basic telephone call answering and processing capabilities provided by Web-enabled terminal 18 according to the present invention are the same as those provided by terminal 9 in prior-art telephone answering apparatus 1 shown in FIG. 1, and suitable techniques and computer programs for implementing these basic telephone call answering and processing capabilities are well know in the art.

While the present invention has been described in terms of various embodiments, it is noted that numerous modifications may be made to these embodiments without departing from the spirit and scope of the present invention as defined in the appended claims, and that all such modifications are intended to fall within the scope of the appended claims.

INDUSTRIAL APPLICABILITY

The present invention is applicable to telephone answering apparatuses and methods.

COMPUTER PROGRAM LISTING

The computer program listed below is written in Microsoft Visual Basic 6.0, and includes two modules.

The first module, which begins at the beginning of the listing and ends near the end of the listing with the line "End Sub" before the line "ClsAddressParser object", implements the telephone number/Web page look-up feature and the Web page display feature of Web-enabled terminal 18 according to the present invention which are described above.

The second module, which begins with the line "ClsAddressParser object" near the end of the listing and ends at the end of the listing, implements the Web browser data exchange feature of Web-enabled terminal 18 according to the present invention which is described above.

```
Option Explicit
Private mHomePage As String                          ' Home page for current account
Private mHomePageRec As Long                         ' Record number for infopage
Private HaveRetrievedHomePage As Boolean             ' We have made request
Private mState As Integer                            ' Current request state
Private mMsgRecord As Object                         ' message record object
Private mBlankPage As String                         ' Blank HTML page.
Private mAddress As clsAddressParser                 ' AddressParser for Dynamic URLs
'
' State Values
'
Private Const steABORT = -1                          ' aborting form
```

-continued

```
Private Const steREADY = 0                                  ' idle state
Private Const steBUSY = 1
Private Sub Cancel_Click()                                  ' User hit canceled button
    If Me.WebControl.Busy Then                              ' if the browser is navigating
        On Error Resume Next                                ' turn off error handling
        Me.WebControl.Stop
        On Error GoTo 0                                     ' enable error handling
    End If
    If mState <> steREADY Then                              ' pending responses
        mState = steABORT                                   ' abort response
        Exit Sub                                            ' exit
    End If
    Frame.UpdateDisplayBrowser False                        ' Answering call will not open browser
    ReleaseModal                                            ' if no pending responses, close form
End Sub
Private Sub cmdBack_Click()
    On Error Resume Next
    Me.WebControl.GoBack
End Sub
Private Sub cmdForward_Click()
    On Error Resume Next
    Me.WebControl.GoForward
End Sub
Private Sub cmdHome_Click()
    On Error Resume Next
    GotoHomePage
End Sub
Private Sub cmdRefresh_Click()
    On Error Resume Next
    Me.WebControl.Refresh
End Sub
Private Sub cmdStop_Click()
    On Error Resume Next
    Me.WebControl.Stop
    Me.Caption = WebControl.LocationName
End Sub
Private Sub cmdZoom_Click()
    On Error GoTo ErrorHandler
    If cmdZoom.Caption = "&Zoom" Then
        cmdZoom.Caption = "&Normal View"                    ' change the caption
        Me.Top = 0
        Me.Left = 0
        Me.Width = Screen.Width
        Me.Height = Screen.Height
    Else
        'the screen is zoomed . . . un-zoom
        cmdZoom.Caption = "&Zoom"
        SyncXY
    End If
    Exit Sub
ErrorHandler:
    Frame.ErrorLog Error
    Err.CLEAR
    Resume Next
End Sub
Private Sub Form_KeyDown(KeyCode As Integer, Shift As Integer)
    If mState <> steREADY Then Exit Sub                     ' if pending a response
    If KeyCode = vbKeyEscape Then
        Cancel_Click                                        ' Simulate the Cancel Button
        KeyCode = 0
    End If
    Dim NewKey As Integer
    NewKey = TranslateKey(KeyCode, Shift)                   ' Translate the key code
        If NewKey Then                                      ' If key translated . . .
            Frame.SendAppNotifyKeyCmd NewKey                ' Send translated key cmd
            KeyCode = 0                                     ' We handled key
            Exit Sub                                        ' All done
        End If                                              '
End Sub
Private Sub Form_Load()
    ' The following property must be set at run time.
    '
    WebControl.Silent = True                                ' Don't show any dialog boxes
                                                            ' If a modal dialog is shown
                                                            ' while this form is hidden
                                                            ' we will lock up.
    mBlankPage = App.Path & "\Blank.htm"                    ' Set the default blank page.
    Set mAddress = New clsAddressParser                     ' New Address Parser for Dynamic URLs
End Sub
```

-continued

```
Private Sub Form_Resize()
    Me.WebControl.Top = 600
    Me.WebControl.Left = 50
    Me.WebControl.Width = Me.Width – 100
    Me.WebControl.Height = Me.Height – 1000
End Sub
Private Sub Form_Unload(Cancel As Integer)
    Set mAddress = Nothing                                      ' Free Memory
End Sub
Private Sub WebControl_BeforeNavigate2(ByVal pDisp As Object, URL As Variant, Flags As Variant,
TargetFrameName As Variant, PostData As Variant, Headers As Variant, Cancel As Boolean)
    Me.WebControl.Visible = True                                ' make sure the browser is visible
    Me.Caption = "Working . . . "                               ' display working status
End Sub
Private Sub WebControl_DocumentComplete(ByVal pDisp As Object, URL As Variant)
    ' Since we let the browser work in the background, we better
    ' make sure that it does not steal the focus.
    On Error Resume Next                                        ' Ignore errors . . .
    If Me.Visible = False Then                                  ' Form is hidden
        Me.WebControl.Visible = False                           ' Hide the control so it will not
                                                                ' take the focus!
        Frame.SetFocus                                          ' Set focus to frame.
    End If
    On Error GoTo 0                                             ' Reset error handler
End Sub
Private Sub WebControl_DownloadComplete()
    Me.Caption = Me.WebControl.LocationName                     ' display url in forms caption
End Sub
Private Sub SyncXY()
    ' The display metrics have changed so we want to
    ' resize the form and controls
    ' Make sure we are not minimized
    '
    Dim xpix
    Dim ypix
    Dim YDIALOG
    Dim XFRAME
    Dim YFRAME
    Dim YTITLE
    Dim YMENU
    Dim bot
    Dim lft
    If Frame.WindowState = 1 Then Exit Sub                      ' Just to be safe
    ' Get system metrics
    '
    Const SM_CYDLGFRAME = 8                                     ' Fixed dialog frame height
    Const SM_CXFRAME = 32                                       ' Sizable dialog frame width
    Const SM_CYFRAME = 33                                       ' Sizable dialog frame height
    Const SM_CYCAPTION = 4                                      ' Title bar height
    Const SM_CYMENU = 15                                        ' Menu height
    xpix = Screen.TwipsPerPixelX                                ' Pixel width
    ypix = Screen.TwipsPerPixelY                                ' Pixel height
    YDIALOG = GetSystemMetrics(SM_CYDLGFRAME)                   ' Fixed border height?
    XFRAME = GetSystemMetrics(SM_CXFRAME)                       ' Sizable border width?
    YFRAME = GetSystemMetrics(SM_CYFRAME)                       ' Sizable border height?
    YTITLE = GetSystemMetrics(SM_CYCAPTION)                     ' Title bar height?
    YMENU = 0                                                   ' No menu
    ' Where is bottom of call lines?
    '
    bot = Frame.Top                                             ' Top of app
    bot = bot + ((YFRAME + YTITLE + YMENU) * ypix)              ' Frame, title, and menu
    bot = bot + Frame.Topper.Top                                ' Top of call lines
    bot = bot + Frame.Topper.Height                             ' Height of call lines
    ' Where is left of call lines?
    '
    lft = Frame.Left                                            ' Left of app
    lft = lft + (XFRAME * xpix)                                 ' Frame
    ' Now set location
    Me.Height = Frame.DispatchBar.Height
    Me.Top = bot                                                ' Top coordinate
    Me.Left = lft                                               ' Left coordinate
    Me.Width = Frame.Topper.Width                               ' Same as topper
End Sub
' ***********************************************************************
' FORM SUPPORT
'
Private Sub ReleaseModal()
    cmdZoom.Caption = "&Zoom"                                   ' reset to normal view
    HaveRetrievedHomePage = False                               ' reset homepage flag
```

```
            If Me.Visible Then                                   ' If visible . . .
                Me.cmdBack.SetFocus                              ' Do it while we can
                Me.WebControl.Visible = False                    ' If the browser is working in the background
                                                                 ' we have to make sure that it will not
                                                                 ' try and take the focus . . .
                Me.Hide                                          ' Release modal
            End If
End Sub
Public Sub ExCancel()
        ' The framework has decided to hide this form from
        ' the screen. Note: We need to wait for any pending responses
        If mState <> steREADY Then
            If gbCrashed = False Then                            ' Network still alive
                Exit Sub
            End If
            mState = steREADY                                    ' Reset state
        End If
        ReleaseModal                                             ' Release modal
End Sub
Public Sub ExModal()
        SyncXY                                                   ' Show below topper
        Frame.IO.ClearKeys                                       ' Clear key buffer
        Frame.IO.EnableKeys True                                 ' Enable key buffering
        Me.WebControl.Visible = True                             ' Make the browser visible
        ModalQ.Show Me                                           ' Show form
End Sub
'
' Keyboard Handler
' Used for KB163 and some specific kb101 keys
'
Public Sub KeyHandler(KeyCode As Variant, Data1 As Variant, Data2 As Variant)
        If mState <> steREADY Then Exit Sub                      ' if pending network response
        On Error GoTo ErrorHandler
        Dim CurCall As Integer
        Dim DialObj As Object
        CurCall = Frame.CurCall                                  ' Keep Track of current call
        Select Case KeyCode                                      ' which key pressed
        Case keyAllRevert                                        ' All Revert key
            If CurCall = 0 Then Exit Sub                         ' If not on a call, abort
            Frame.IO.RevertCalls REVERT_LIVE
        Case keyClear                                            ' Clear key
            ReleaseModal                                         ' Hide this form
        Case keyChkPatch                                         ' Check Patch Key
            If CurCall <> 0 Then Exit Sub                        ' must be on a call
            If Frame.IO.Acd.en Then Exit Sub                     ' I agent call taking enabled, abort
            Frame.Modal WCHKPATCH                                ' Open Check Patch window
        Case keyConf                                             ' Conference key
            If CurCall = 0 Then Exit Sub                         ' Must be on a call
            Frane.IO.SaveScreenData SCR_STOP_VOICE               ' Save Screen Data and stop voice
            Frame.Modal WCONFERENCE                              ' Display conference window.
        Case keyDial                                             ' Dial key
            If CurCall = 0 Then Exit Sub                         ' If not on a call, abort
            Frame.IO.StopVoice                                   ' stop voice
            Set DialObj = Frame.IO.DialList                      ' Get Dial List object
            DialObj.Prefix = Frame.IO.Slot(CurCall).ScreenDialPrefix
            DialObj.MaxChars = Frame.IO.Slot(CurCall).ScreenDialLength
            Frame.IO.ShowDial DialObj, DL_GET_ALL                ' Show Dial popup window
            Set DialObj = Nothing                                ' Release Dial List object
        Case keyDialList                                         ' Dial List key
            If CurCall = 0 Then Exit Sub                         ' If not on a call, abort
            Frame.IO.StopVoice                                   ' stop voice
            Set DialObj = Frame.IO.DialList                      ' Get Dial List object
            Frame.IO.ShowDialList DialObj, DL_GET_ALL
                                                                 ' Show DialList popup window
            Set DialObj = Nothing                                ' Release Dial List object
        Case keyDirectory                                        ' Directory key
            If Not Frame.IO.Features.Directory Then              ' If directory disabled . . .
                Frame.ErrorLog "Directory feature disabled"
                Exit Sub                                         ' Abort
            End If                                               '
            If gbACD And Not gbACD_Dir Then                      ' No ACD w/Dir support
                Frame.ErrorLog "Directory feature disabled"
                Exit Sub                                         ' Exit
            End If
            If CurCall Then                                      ' If on a call . . .
                Frame.IO.SaveScreenData SCR_STOP_VOICE           ' Save screen data (and stop voice)
            End If                                               '
            Frame.Modal WDIR                                     ' Show directory window
        Case keyOnCall                                           ' OnCall Window
```

```
    If Not Frame.IO.Features.OnCallSchedule Then
        Frame.ErrorLog "OnCall feature disabled"
        Exit Sub                                            ' Feature not enabled, Exit
    End If
    If gbACD And Not gbACD_OnCall Then                      ' ACD w/OnCall support
        Frame.ErrorLog "OnCall feature disabled"
        Exit Sub                                            ' Exit
    End If
    If CurCall Then                                         ' If on a call
        Frame.IO.SaveScreenData SCR_STOP_VOICE              ' save screen data (and stop voice)
    End If
    Frame.Modal WONCALL                                     ' Show OnCall Window
Case keyDiscAll                                             ' Disconnect All key
    If CurCall = 0 Then Exit Sub                            ' If not on a call, abort
    Frame.IO.HangupAll                                      ' Hangup all talkpaths on call
Case keyDisc, keyDiscReturn                                 ' Disconnect or Disc&Return key
    If CurCall = 0 Then Exit Sub                            ' If not on a call, abort
    Frame.IO.Hangup                                         ' Hangup current talkpath on call
Case keyDone                                                ' Done key
    If CurCall = 0 Then Exit Sub                            ' If not on a call, abort
    ReleaseModal                                            ' Release modal
    Frame.IO.DestroyCall True                               ' Release call from screen
Case keyEvents                                              ' Event key
    Dim Flags As Long
    If CurCall = 0 Then Exit Sub                            ' If not on a call, abort
    Flags = SCR_STOP_VOICE Or SCR_SAVE_TO_HOST Or SCR_SAVE_TEMP_INFO
                                                            ' set stop voice, save msg/spcl to host,
                                                            ' and save temp info to host flags
    Frame.IO.SaveScreenData Flags&                          ' save screen data
    Frame.Modal WEVENT                                      ' Show Event window
Case keyFastFwrd                                            ' Fast forward key
    Select Case Frame.CurMode                               ' What is the call mode?
        Case MODE_SINFO_SMESG, _
            MODE_SINFO_SSPCL, _
            MODE_TRANSCRIPTION
            Frame.IO.VoiceFastFwrd                          ' Fast forward
    End Select
Case keyFetch                                               ' Fetch key
Case keyFlash                                               ' Flash key
    Frame.IO.Dial "F", 0, 0                                 ' Initiate dialout
Case keyHoldPark                                            ' Hold & Park key
    If CurCall = 0 Then Exit Sub                            ' If not on a call, abort
    Frame.UpdateDisplayBrowser True                         ' Remember to open browser
    ReleaseModal                                            ' Release modal
    Frame.IO.ParkCall gnStation                             ' Park call to self
Case keyHoldReturn                                          ' Hold & Return key
    If CurCall = 0 Then Exit Sub                            ' If not on a call, abort
    Frame.IO.AnswerCall CurCall                             ' Toggle call
Case keyLine1                                               ' Line 1 key
    If CurCall <> 1 Then                                    ' If changing lines . . .
        Frame.UpdateDisplayBrowser True                     ' Remember to open browser
        ReleaseModal                                        ' Release modal
    End If
    Frame.IO.AnswerCall 1                                   ' Answer call line 1
Case keyLine2                                               ' Line 2 key
    If CurCall <> 2 Then                                    ' If changing lines . . .
        Frame.UpdateDisplayBrowser True                     ' Remember to open browser
        ReleaseModal                                        ' Release modal
    End If
    Frame.IO.AnswerCall 2                                   ' Answer call line 2
Case keyLine3                                               ' Line 3 key
    If CurCall <> 3 Then                                    ' If changing lines . . .
        Frame.UpdateDisplayBrowser True                     ' Remember to open browser
        ReleaseModal                                        ' Release nodal
    End If
    Frame.IO.AnswerCall 3                                   ' Answer call line 3
Case keyMenu                                                ' Menu key
    If CurCall Then                                         ' If on a call . . .
        Frame.IO.SaveScreenData SCR_STOP_VOICE              ' Save screen data and stop voice
    End If
    ' Using the Frame.Modal method will cause this window
    ' to be hidden, DO NOT hide this window before Modal()
    ' does it's thing.
    '
    Frame.nmenu = MNU_BASIC                                 ' Set menu type to Basic menu
    Frame.Modal WMENU                                       ' Show Menu window
Case keyNewRevert                                           ' New Revert key
    If CurCall = 0 Then Exit Sub                            ' If not on a call, abort
    Frame.IO.RevertCalls REVERT_UNANS
```

-continued

```
Case keyNoMsg                                          ' No Message key
    If CurCall = 0 Then Exit Sub                       ' If not on a call, abort
    If Frame.IO.Slot(CurCall).NoMsgKey Then            ' NoMsg key enabled . . .
        ReleaseModal                                   ' Release modal
        Frame.IO.DestroyCall False                     ' Terminate call
    Else
        Frame.ErrorLog "Key disabled for client"
                                                       ' Display error
    End If
Case keyOff                                            ' Off key
    Frame.IO.CallTakingOff
Case keyOn                                             ' On key
    Frame.IO.CallTakingOn
Case keyOpOut                                          ' Op Out key
    If CurCall = 0 Then Exit Sub                       ' If not on a call, abort
    Frame.IO.OpOut                                     ' Send Op Out command
Case keyPark                                           ' Park key
    If CurCall = 0 Then Exit Sub                       ' If not on a call, abort
    ' Show the popup park window ' Using the Frame.Modal method will cause this window
    ' to be hidden, DO NOT hide this window before Modal()
    ' does it's thing.

Frame.Modal WPARK                                  ' Show Park window
Case keyParkDistribution                               ' Park Distribution Key
    If CurCall = 0 Then Exit Sub                       ' Must be on call
    Frame.IO.ParkCallToDistrib                         ' Cause a park to dist. event.
                                                       ' IO.Prompt app will actually open the form.
Case keyParkOrbit                                      ' Park Orbit key
    If CurCall Then                                    ' if on a call
        Frame.IO.OrbitCall                             ' Orbit the call
    Else
        If Frame.IO.Acd.Enabled Then Exit Sub          ' if Agent call taking enabled, abort
        Frame.Modal WCHKORBIT                          ' Display Check Orbit Window
    End If
Case keyPatch                                          ' Patch key
    If CurCall Then Frame.IO.PatchCall 0
Case keyPatch1                                         ' Patch line 1 key
    If CurCall Then Frame.IO.PatchCall 1
Case keyPatch2                                         ' Patch line 2 key
    If CurCall Then Frame.IO.PatchCall 2
Case keyPatch3                                         ' Patch line 3 key
    If CurCall Then Frame.IO.PatchCall 3
Case keyQuickXfer1                                     ' Quick Transfer 1 key
    If CurCall = 0 Then Exit Sub                       ' must be on call
    If Frame.IO.Features.QuickXferKeys = 0 Then        ' If Quick Transfer feature disabled . . .
        Frame.ErrorLog _
            "Quick Transfer feature disabled"
        Exit Sub                                       ' Ignore key
    End If
    Frame.QuickChangeAndDial 1                         ' Chg client and dial to xfer list 1
Case keyQuickXfer2                                     ' Quick Transfer 2 key
    If CurCall = 0 Then Exit Sub                       ' must be on call
    If Frame.IO.Features.QuickXferKeys = 0 Then        ' If Quick Transfer feature disabled . . .
        Frame.ErrorLog _
            "Quick Transfer feature disabled"
        Exit Sub                                       ' Ignore key
    End If
    Frame.QuickChangeAndDial 2                         ' Chg client and dial to xfer list 2
Case keyQuickXfer3                                     ' Quick Transfer 3 key
    If CurCall = 0 Then Exit Sub                       ' must be on call
    If Frame.IO.Features.QuickXferKeys = 0 Then        ' If Quick Transfer feature disabled . . .
        Frame.ErrorLog _
            "Quick Transfer feature disabled"
        Exit Sub                                       ' Ignore key
    End If
    Frame.QuickChangeAndDial 3                         ' Chg client and dial to xfer list 3
Case keyQuickXfer4                                     ' Quick Transfer 4 key
    If CurCall = 0 Then Exit Sub                       ' must be on call
    If Frame.IO.Features.QuickXferKeys = 0 Then        ' If Quick Transfer feature disabled . . .
        Frame.ErrorLog _
            "Quick Transfer feature disabled"
        Exit Sub                                       ' Ignore key
    End If
    Frame.QuickChangeAndDial 4                         ' Chg client and dial to xfer list 4
Case keyQuickXfer5                                     ' Quick Transfer 5 key
    If CurCall = 0 Then Exit Sub                       ' must be on call
    If Frame.IO.Features.QuickXferKeys = 0 Then        ' If Quick Transfer feature disabled . . .
```

```
                Frame.ErrorLog
                    "Quick Transfer feature disabled"
                Exit Sub                                        ' Ignore key
            End If                                              '
            Frame.QuickChangeAndDial 5                          ' Chg client and dial to xfer list 5
        Case keyQuickXfer6                                      ' Quick Transfer 6 key
            If CurCall = 0 Then Exit Sub                        ' must be on call
            If Frame.IO.Features.QuickXferKeys = 0 Then         ' If Quick Transfer feature disabled . . .
                Frame.ErrorLog _
                    "Quick Transfer feature disabled"
                Exit Sub                                        ' Ignore key
            End If                                              '
            Frame.QuickChangeAndDial 6                          ' Chg client and dial to xfer list 6
        Case keyQuickXfer7                                      ' Quick Transfer 7 key
            If CurCall = 0 Then Exit Sub                        ' must be on call
            If Frame.IO.Features.QuickXferKeys = 0 Then         ' If Quick Transfer feature disabled . . .
                Frame.ErrorLog _
                    "Quick Transfer feature disabled"
                Exit Sub                                        ' Ignore key
            End If                                              '
            Frame.QuickChangeAndDial 7                          ' Chg client and dial to xfer list 7
        Case keyQuickXfer8                                      ' Quick Transfer 8 key
            If CurCall = 0 Then Exit Sub                        ' must be on call
            If Frame.IO.Features.QuickXferKeys = 0 Then         ' If Quick Transfer feature disabled . . .
                Frame.ErrorLog _
                    "Quick Transfer feature disabled"
                Exit Sub                                        ' Ignore key
            End If                                              '
            Frame.QuickChangeAndDial 8                          ' Chg client and dial to xfer list 8
        Case keyQuickXfer9                                      ' Quick Transfer 9 key
            If CurCall = 0 Then Exit Sub                        ' must be on call
            If Frame.IO.Features.QuickXferKeys = 0 Then         ' If Quick Transfer feature disabled . . .
                Frame.ErrorLog _
                    "Quick Transfer feature disabled"
                Exit Sub                                        ' Ignore key
            End If                                              '
            Frame.QuickChangeAndDial 9                          ' Chg client and dial to xfer list 9
        Case keyQuickXfer10                                     ' Quick Transfer 10 key
            If CurCall = 0 Then Exit Sub                        ' must be on call
            If Frame.IO.Features.QuickXferKeys = 0 Then         ' If Quick Transfer feature disabled . . .
                Frame.ErrorLog _
                    "Quick Transfer feature disabled"
                Exit Sub                                        ' Ignore key
            End If                                              '
            Frame.QuickChangeAndDial 10                         ' Chg client and dial to xfer list 10
        Case keyQuickXfer2                                      ' Quick Transfer 2 key
            If CurCall = 0 Then Exit Sub                        ' must be on call
            If Frame.IO.Features.QuickXferKeys = 0 Then         ' If Quick Transfer feature disabled . . .
                Frame.ErrorLog _
                    "Quick Transfer feature disabled"
                Exit Sub                                        ' Ignore key
            End If                                              '
            Frame.QuickChangeAndDial 10                         ' Chg client and dial to xfer list 10
        Case keyQuickXfer11                                     ' Quick Transfer 11 key
            If CurCall = 0 Then Exit Sub                        ' must be on call
            If Frame.IO.Features.QuickXferKeys = 0 Then         ' If Quick Transfer feature disabled . . .
                Frame.ErrorLog _
                    "Quick Transfer feature disabled"
                Exit Sub                                        ' Ignore key
            End If                                              '
            Frame.QuickChangeAndDial 11                         ' Chg client and dial to xfer list 11
        Case keyQuickXfer12                                     ' Quick Transfer 12 key
            If CurCall = 0 Then Exit Sub                        ' must be on call
            If Frame.IO.Features.QuickXferKeys = 0 Then         ' If Quick Transfer feature disabled . . .
                Frame.ErrorLog _
                    "Quick Transfer feature disabled"
                Exit Sub                                        ' Ignore key
            End If                                              '
            Frame.QuickChangeAndDial 12                         ' Chg client and dial to xfer list 12
        Case keyRewind                                          ' Rewind Key
            Select Case Frame.CurMode                           ' What is the current call mode
                Case MODE_SINFO_SMESG, _
                    MODE_SINFO_SSPCL, _
                    MODE_TRANSCRIPTION
                    Frame.IO.VoiceRewind
            End Select
        Case keySendDigits                                      ' Send Digits key
            If CurCall Then Exit Sub                            ' must be on a call
            Frame.IO.SaveScreenData SCR_STOP_VOICE              ' Save screen and stop voice
```

-continued

```
        Set DialObj = Frame.IO.DialList                                 ' Create dial list object
        Frame.IO.ShowDial DialObj, DL_GET_NONE                          ' Show dial window
        Set DialObj = Nothing                                           ' Delete object
    Case keyRepeat                                                      ' Repeat or Print key
        If CurCall = 0 Then Exit Sub                                    ' If not on a call, abort
        ' Show the popup repeat window
        '
        ' Using the Frame.Modal method will cause this window
        ' to be hidden, DO NOT hide this window before Modal()
        ' does it's thing.
        '
        Frame.Modal WREPEAT                                             ' Show Repeat window
    Case keySearch                                                      ' Search key
        If CurCall = 0 Then Exit Sub                                    ' If not on a call, abort
        Select Case Frame.CurMode                                       ' what is current call mode?
            Case MODE_SINFO_TMESG, MODE_SSPCL_TMESG, MODE_SINFO_SMESG, MODE_SINFO_SSPCL,
MODE_MSG_HISTORY, MODE_SPCL_HISTORY
                ' Using the Frame.Modal method will cause this window
                ' to be hidden, DO NOT hide this window before Modal()
                ' does it's thing.
                '
                Frame.IO.SaveScreenData SCR_STOP_VOICE                  ' Save screen data and stop voice
                Frame.nMenu = MNU_ACCT_SRCH                             ' Set menu type to Account Search menu
                Frame.Modal WMENU                                       ' Show Menu window
        End Select
    Case keyTransfer                                                    ' Transfer key
        If CurCall = 0 Then Exit Sub                                    ' If not on a call, abort
        Frame.IO.StopVoice                                              ' stop voice
        Set DialObj = Frame.IO.DialList                                 ' Get Dial List object
        DialObj.Prefix = Frame.IO.Slot(CurCall).ScreenXferPrefix
        DialObj.MaxChars = Frame.IO.Slot(CurCall).ScreenXferLength
        Frame.IO.ShowDial DialObj, DL_GET_ALL                           ' Show Dial popup window
        Set DialObj = Nothing                                           ' Release Dial List object
    Case keyVoiceA                                                      ' Voice A key
        If CurCall = 0 Then Exit Sub                                    ' must be on call
        If Not Frame.IO.Slot(CurCall).VoiceAKey Then                    ' If Voice A Key disabled . . .
            Frame.ErrorLog "Key disabled for client"                    ' Display error
            Frame.IO.StopVoice                                          ' make sure voice is stopped
            Exit Sub                                                    ' exit
        End If                                                          '
        Select Case Frame.CurMode                                       ' which call mode
            Case MODE_SINFO_TMESG, MODE_SSPCL_TMESG                     ' taking new message modes
                Frame.IO.VoiceRecord                                    ' start recording voice
            Case MODE_SINFO_SMESG, MODE_TRANSCRIPTION                   ' dispatch or transcription mode
                Frame.IO.VoicePlay                                      ' start playing voice
        End Select                                                      '
    Case keyVoiceB                                                      ' Voice B key
        If CurCall = 0 Then Exit Sub                                    ' must be on call
        If Not Frame.IO.Slot(CurCall).VoiceBKey Then                    ' If Voice B Key disabled . . .
            Frame.ErrorLog "Key disabled for client"                    ' Display error
            Frame.IO.StopVoice                                          ' make sure voice is stopped
            Exit Sub                                                    ' exit
        End If                                                          '
        Select Case Frame.CurMode                                       ' which call mode?
            Case MODE_SINFO_TMESG, MODE_SSPCL_TMESG, MODE_SINFO_SMESG, MODE_TRANSCRIPTION
                Frame.IO.VoiceErase                                     ' erase voice
        End Select                                                      '
    Case keyVoiceC                                                      ' Voice C key
        If CurCall = 0 Then Exit Sub                                    ' must be on call
        If Frame.IO.Slot(CurCall).VoiceCKey Then                        ' If Voice C Key enabled . . .
            Select Case Frame.CurMode                                   ' which call mode?
                Case MODE_SINFO_TMESG, MODE_SSPCL_TMESG, MODE_SINFO_SMESG, MODE_SINFO_SSPCL,
MODE_SINFO_TSPCL, MODE.TRANSCRIPTION
                                                                        ' not showing history modes . . .
                    Frame.IO.TransferToVM                               ' transfer call to voice mail
            End Select                                                  '
        Else
            Frame.ErrorLog "Key disabled for client"                    ' Display error
        End If                                                          '
    Case keyVoiceD                                                      ' Voice D key
        If CurCall = 0 Then Exit Sub                                    ' Must be on call
        Dim nList%
        nList% = Frame.IO.Slot(CurCall).VoiceDList                      ' Get client's Voice D Dial List number
        If nList% Then                                                  ' If valid Voice D Dial List number . . .
            Frame.IO.Dial " ", nList%, nList%                           ' Dial Voice D Dial List string
        End If                                                          '
    Case keyHomePage                                                    ' Open Account's Home page
        cmdHome_Click                                                   ' Simulate the home key
    Case keyHome                                                        ' Home Key
```

```
        cmdHome_Click                                  ' Simulate the Home button click
Case keyInfoLast                                       ' InfoLast Key - Map to Back button
        cmdBack_Click                                  ' Simulate the back button click
Case keyInfoNext                                       ' InfoNext Key - Map to forward Button
        cmdForward_Click                               ' Simulate the next button click
Case keyMsgLast                                        ' Msg Last key - Map to Back button
        cmdBack_Click                                  ' Simulate the back button click
Case keyMsgNext                                        ' Msg Next Key - Map to forward Button
        cmdForward_Click                               ' Simulate the Next button
        End Select                                     '
        Exit Sub                                       ' We are done.
ErrorHandler:
    Frame.ErrorLog    "Browser Key Command: " & _
                      KeyCode & _
                      "  could not be processed"       ' Show error
    Err.CLEAR
    Exit Sub
End Sub
'
' Slot Changed Handler
' Used for performing specific tasks when call slot
' has changed
'
Public Sub SlotChgdHandler(NewSlotNum As Integer)
    If mState <> steREADY Then                         ' Still waiting for responses . . .
        mState = steABORT                              ' Abort request state
        Exit Sub
    End If
    ReleaseModal                                       ' Hide window
End Sub
Public Sub NavigateToURL(URL As String)
    On Error GoTo NavigateError
    mAddress.ParseAddress URL                          ' Parse for know keywords
    Me.WebControl.Navigate URL                         ' Navigate to a given URL
    Exit Sub
NavigateError:
    Frame.ErrorLog Err.Description
    Exit Sub
End Sub
Private Sub GetHomePage()
    Dim CurAccountNum As String
    ' Get the current HomePage InfoPage number
    '
    mHomePageRec = Frame.IO.Slot(Frame.CurCall).URLInfoPageNum - 1
    CurAccountNum = Frame.IO.Slot(Frame.CurCall).Client
    If mHomePageRec < 0 Then                           ' if no homepage
        mHomePage = gsDefaultPage                      ' set to empty page
        HaveRetrievedHomePage = True                   ' set homepage flag
        GotoHomePage                                   ' navigate to default page
        Exit Sub                                       ' nothing left to do
    End If
    ' Now we need to create a request packet . . .
    ' This will request accounts home page from server
    Dim Pkt As Object
    Set Pkt = Frame.IO.Request()
    Pkt.Header = RQT_GET_INFOPAGE
    Pkt.AddStack2 CurAccountNum
    Pkt.AddStack mHomePageRec
    Pkt.Responses = True
    Dim URL As String
    posDialChar = 1
    Do While posDialChar
        posDialChar = InStr(posDialChar, InfoPage, _
            Chr(167), vbTextCompare)
        If posDialChar = 0 Then Exit Function          ' If no dial char exit
        ' check for a " after dialchar
        If Mid(InfoPage, posDialChar + 1, 1) = Chr(34) Then
            posEndQuote = InStr(posDialChar + 2, InfoPage, Chr(34), vbTextCompare)
            ' check for a 'U' at the end of string
            If posEndQuote <> 0 Then
                If InStr(posEndQuote, InfoPage, "U", vbTextCompare) = 0 Then
                    ' not a URL
                Else
                    ' this is a url, exit the loop
                    Exit Do
                End If
            End If
        End If
        posDialChar = posDialChar + 1
```

```
        Loop
        URLStart = Instr(posDialChar, _
            InfoPage, Chr(34), vbTextCompare)              ' find first quote
        URLStart = URLStart + 1                            ' Compensate for "
        URLEnd = InStr(URLStart, InfoPage, _
            Chr(34), vbTextCompare)                        ' find ending quote
        URL = Mid(InfoPage, URLStart, URLEnd – URLStart)
        URL = RemoveCRLFs(URL)
        GetURLFromInfoPage = URL
End Function
Public Function RemoveCRLFs(Str As String)
    Dim pos As Integer
    pos = 1                                                ' initialize the position
    Do While pos                                           ' loop until no crlf's are found
        pos = Instr(pos, Str, vbCrLf, _
            vbTextCompare)                                 ' locate CRLF
        If pos Then                                        ' if we found a crlf
            Str = Left(Str, pos – 1) & _
                Mid(Str, pos + 2)                          ' remove crlf
            pos = 1                                        ' set pos back to 1
        End If
    Loop
    RemoveCRLFs = Str
End Function
Public Sub ResetBrowser()
    ResetTimer.Enabled = False                             ' Only do it once
    NavigateToURL mBlankPage
End Sub
ClsAddressParser object
'
' This Class module is used by the Browser
' to parse the address strings for a given
' keyword. If the parser finds a keyword,
' it will simply replace the keyword with
' appropriate value.
' ie: www.amtelcon.con/<oper> translates to:
' www.antelcom.com/system . . . assuming the
' logged in operator name = system.
' Keyword Definations
'
Const Key_Login = "<LOGIN>"                                ' Operator Login Name
Const Key_Initials = "<INITIALS>"                          ' Operator initials"
Const Key_StnNumber = "<STATION_NUMBER>"                   ' Current station number
Const Key_Client = "<CLIENT NUMBER>"                       ' Client number of current line
Const Key_Name = "<CLIENT_NAME>"                           ' Client account name
Const Key_ANI = "<ANI>"                                    ' ANI of current call
Const Key_Kind = "<CALL_KIND>"                             ' Call kind of current call
Const Key_Date = "<DATE>"                                  ' Current Date
Const Key_Time = "<TIME>"                                  ' Current Time
Public Sub ParseAddress(ByRef Address As String)
    ReplaceKeyWord Key_Login, Address
    ReplaceKeyWord Key_Initials, Address
    ReplaceKeyWord Key_StnNumber, Address
    ReplaceKeyWord Key_Client, Address
    ReplaceKeyWord Key_Name, Address
    ReplaceKeyWord Key_ANI, Address
    ReplaceKeyWord Key_Kind, Address
    ReplaceKeyWord Key_Date, Address
    ReplaceKeyWord Key_Time, Address
    ReplaceKeyWord Key_Login, Address
    ReplaceKeyWord Key_Login, Address
End Sub
Private Sub ReplaceKeyword(Keyword As String, Address As String)
    Dim iposStart As Integer                               ' Start of KeyWord
    Dim 1 As String
    Dim r As String
    Do
        iposStart = InStr(1, Address, _
            Keyword, vbTextCompare)                        ' Get first pos of KeyWord
        if iposStart <> 0 Then                             ' If we found keyword
            1 = Left(Address, iposStart – 1)
            r = Mid(Address, (Len(KeyWord) + iposStart))
            Address = 1 & Trim(GetValue(KeyWord)) & r
        Else
            Exit Do                                        ' We are done
        End If
    Loop
End Sub
Private Function GetValue(KeyWord As String) As String
```

-continued

```
    Dim iSlot As Integer
    iSlot = Frame.CurCall
    Select Case KeyWord
        Case Key_Login
            GetValue = Frame.IO.Agent.Name
        Case Key_Initials
            GetValue = Frame.IO.Agent.Initials
        Case Key_StnNumber
            GetValue = gnStation
        Case Key_Client
            GetValue = Frame.IO.Slot(iSlot).Client
        Case Key_Name
            GetValue = Frame.IO.Slot(iSlot).Name
        Case Key_Kind
            GetValue = Frame.IO.Slot(iSlot).KindString
        Case Key_ANI
            GetValue = Frame.IO.Slot(iSlot).CallerId
        Case Key_Date
            GetValue = Date
        Case Key_Time
            GetValue = Time
        Case Else
    End Select
End Function
```

We claim:

1. A telephone answering apparatus for answering telephone calls to telephone numbers for which telephone calls are being answered by the telephone answering apparatus, the telephone answering apparatus comprising:
a storage device which stores information linking at least one of the telephone numbers for which telephone calls are being answered by the telephone answering apparatus to a uniform resource locator (URL) identifying a page on the World Wide Web (Web page) associated with the telephone number;
a look-up device which looks up the telephone number of each telephone call answered by the telephone answering apparatus in the storage device and, if the telephone number is found in the storage device, retrieves the URL identifying the Web page associated with the telephone number from the storage device;
a display; and
a Web page display device which displays on the display the Web page associated with the telephone number of the telephone call answered by the telephone answering apparatus in response to the URL retrieved from the storage device.

2. A telephone answering apparatus according to claim 1, further comprising an answering device which answers telephone calls to telephone numbers for which telephone calls are being answered by the telephone answering apparatus.

3. A telephone answering apparatus according to claim 2, wherein the answering device includes a terminal which enables a user of the terminal to answer telephone calls to telephone numbers for which telephone calls are being answered by the telephone answering apparatus; and
wherein the terminal includes the look-up device and the Web page display device.

4. A telephone answering apparatus according to claim 3, wherein the user is an operator of a telephone answering service; and
wherein the terminal is an operator station of the telephone answering service.

5. A telephone answering apparatus according to claim 3, wherein the user is an operator of a call center; and wherein the terminal is an operator station of the call center.

6. A telephone answering apparatus according to claim 3, wherein the user is an individual user; and
wherein the terminal is a personal computer or a workstation used by the individual user.

7. A telephone answering apparatus according to claim 3, wherein the terminal includes an input device which enables the user to answer a telephone call, which is waiting to be answered by the user, to a telephone number for which telephone calls are being answered by the telephone answering apparatus.

8. A telephone answering apparatus according to claim 7, wherein when the telephone call answered by the user is a telephone call to a telephone number having a Web page associated therewith, the Web page display device displays on the display the Web page associated with the telephone number of the telephone call answered by the user in response to the telephone call being answered by the user and the URL retrieved from the storage device.

9. A telephone answering apparatus according to claim 7, wherein the Web page display device includes a Web browser; and
wherein when the telephone call answered by the user is a telephone call to a telephone number having a Web page associated therewith, the Web browser displays on the display the Web page associated with the telephone number of the telephone call answered by the user in response to the telephone call being answered by the user and the URL retrieved from the storage device.

10. A telephone answering apparatus according to claim 7, wherein the terminal enables a plurality of telephone calls answered by the user to be active simultaneously.

11. A telephone answering apparatus according to claim 10, wherein the input device enables the user to move between the active answered telephone calls to select one of the active answered telephone calls for processing.

12. A telephone answering apparatus according to claim 10, wherein when any of the active answered telephone calls is a telephone call to a telephone number having a Web page associated therewith, the Web page display device displays on the display the Web page associated with the telephone number of the active answered telephone call in response to the active answered telephone call being answered by the user and the URL retrieved from the storage device.

13. A telephone answering apparatus according to claim 12, wherein the input device enables the user to move between the active answered telephone calls to select one of the active answered telephone calls for processing; and wherein as the user moves between the active answered telephone calls to select one of the active answered telephone calls for processing, the Web page display device displays the Web page associated with the telephone number of the active answered telephone call which the user has selected for processing if the selected active answered telephone call is to a telephone number having a Web page associated therewith.

14. A telephone answering apparatus according to claim 10, wherein the input device enables the user to issue a single command with the input device to move between the active answered telephone calls to select one of the active answered telephone calls for processing.

15. A telephone answering apparatus according to claim 14, wherein the input device includes a keyboard; and wherein user issues the single command with a single keystroke on the keyboard.

16. A telephone answering apparatus according to claim 14, wherein the input device includes a pointing device; and wherein the user issues the single command with a single operation of the pointing device.

17. A telephone answering apparatus according to claim 3, wherein the terminal displays on the display an indication that a telephone call to a telephone number for which telephone calls are being answered by the telephone answering apparatus is waiting to be answered by the user.

18. A telephone answering apparatus according to claim 3, wherein the answering device further includes an auto attendant which automatically answers telephone calls to telephone numbers for which telephone calls are being answered by the telephone answering apparatus without requiring the attention of the user; and wherein the storage device stores information specifying whether telephone calls to each of the telephone numbers for which telephone calls are being answered by the telephone answering apparatus are to be answered initially by the user or by the auto attendant.

19. A telephone answering apparatus according to claim 18, wherein when the auto attendant answers a telephone call to a telephone number for which telephone calls are being answered by the telephone answering apparatus, the auto attendant gives a caller who has made the telephone call the option to have the telephone call transferred to the terminal for answering by the user.

20. A telephone answering apparatus according to claim 1, wherein the Web page associated with the telephone number of the telephone call answered by the telephone answering apparatus is located on the Internet.

21. A telephone answering apparatus according to claim 1, wherein the Web page associated with the telephone number of the telephone call answered by the telephone answering apparatus is located on an intranet.

22. A telephone answering method for answering telephone calls to telephone numbers for which telephone calls are being answered by the telephone answering method, the telephone answering method comprising the steps of:

storing information linking at least one of the telephone numbers for which telephone calls are being answered by the telephone answering method to a uniform resource locator (URL) identifying a page on the World Wide Web (Web page) associated with the telephone number;

looking up the telephone number of each telephone call answered by the telephone answering method in the stored information and, if the telephone number is found in the stored information, retrieving the URL identifying the Web page associated with the telephone number from the stored information; and displaying the Web page associated with the telephone number of the telephone call answered by the telephone answering method in response to the URL retrieved from the stored information.

23. A telephone answering method according to claim 22, further comprising the step of answering telephone calls to telephone numbers for which telephone calls are being answered by the telephone answering method.

24. A telephone answering method according to claim 23, wherein the answering step includes the step of a user of a terminal answering, with the terminal, telephone calls to telephone numbers for which telephone calls are being answered by the telephone answering method.

25. A telephone answering method according to claim 24, wherein the user is an operator of a telephone answering service; and wherein the terminal is an operator station of the telephone answering service.

26. A telephone answering method according to claim 24, wherein the user is an operator of a call center; and wherein the terminal is an operator station of the call center.

27. A telephone answering method according to claim 24, wherein the user is an individual user; and wherein the terminal is a personal computer or a workstation used by the individual user.

28. A telephone answering method according to claim 24, wherein the terminal includes an input device; and wherein the user uses the input device to answer a telephone call, which is waiting to be answered by the user, to a telephone number for which telephone calls are being answered by the telephone answering method.

29. A telephone answering method according to claim 28, wherein the displaying step further includes the step of, when the telephone call answered by the user is a telephone call to a telephone number having a Web page associated therewith, displaying to the user the Web page associated with the telephone number of the telephone call answered by the user in response to the telephone call being answered by the user and the URL retrieved from the stored information.

30. A telephone answering method according to claim 28, wherein the displaying step further includes the step of, when the telephone call answered by the user is a telephone call to a telephone number having a Web page associated therewith, displaying to the user, using a Web browser, the Web page associated with the telephone number of the telephone call answered by the user in response to the telephone call being answered by the user and the URL retrieved from the stored information.

31. A telephone answering method according to claim 28, wherein a plurality of telephone calls answered by the user may be active simultaneously.

32. A telephone answering method according to claim 31, further comprising the step of the user using the input device to move between the active answered telephone calls to select one of the active answered telephone calls for processing.

33. A telephone answering method according to claim 31, wherein the displaying step further includes the step of, when any of the active answered telephone calls is a telephone call to a telephone number having a Web page associated therewith, displaying to the user the Web page associated with the telephone number of the active answered telephone call in response to the active answered telephone call being answered by the user and the URL retrieved from the stored information.

34. A telephone answering method according to claim 33, further comprising the step of the user using the input device to move between the active answered telephone calls to select one of the active answered telephone calls for processing; and wherein the displaying step further includes the step of, as the user moves between the active answered telephone calls to select one of the active answered telephone calls for processing, displaying to the user the Web page associated with the telephone number of the active answered telephone call which the user has selected for processing if the selected active answered telephone call is to a telephone number having a Web page associated therewith.

35. A telephone answering method according to claim 31, further comprising the step of the user issuing a single command with the input device to move between the active answered telephone calls to select one of the active answered telephone calls for processing.

36. A telephone answering method according to claim 35, wherein the input device includes a keyboard; and wherein the user issues the single command with a single keystroke on the keyboard.

37. A telephone answering method according to claim 35, wherein the input device includes a pointing device; and wherein the user issues the single command with a single operation of the pointing device.

38. A telephone answering method according to claim 24, further comprising the step of displaying to the user an indication that a telephone call to a telephone number for which telephone calls are being answered by the telephone answering method is waiting to be answered by the user.

39. A telephone answering method according to claim 24, wherein the answering step further includes the step of automatically answering telephone calls to telephone numbers for which telephone calls are being answered by the telephone answering method without requiring the attention of the user; and wherein the storing step further includes the step of storing information specifying whether telephone calls to each of the telephone numbers for which telephone calls are being answered by the telephone answering method are to be answered initially by the user or automatically without requiring the attention of the user.

40. A telephone answering method according to claim 39, further comprising the step of, when a telephone call to a telephone number for which telephone calls are being answered by the telephone answering method has been answered automatically without requiring the attention of the user, giving a caller who has made the telephone call which has been answered automatically the option to have the telephone call transferred for answering by the user.

41. A telephone answering method according to claim 22, wherein the Web page associated with the telephone number of the telephone call answered by the telephone answering method is located on the Internet.

42. A telephone answering method according to claim 22, wherein the Web page associated with the telephone number of the telephone call answered by the telephone answering method is located on an intranet.

43. A processor-readable medium having stored therein a program which, when executed by a processor, causes the processor to perform a telephone answering method for answering telephone calls to telephone numbers for which telephone calls are being answered by the telephone answering method, the telephone answering method comprising the steps of:

storing information linking at least one of the telephone numbers for which telephone calls are being answered by the telephone answering method to a uniform resource locator (URL) identifying a page on the World Wide Web (Web page) associated with the telephone number;

looking up the telephone number of each telephone call answered by the telephone answering method in the stored information and, if the telephone number is found in the stored information, retrieving the URL identifying the Web page associated with the telephone number from the stored information; and displaying the Web page associated with the telephone number of the telephone call answered by the telephone answering method in response to the URL retrieved from the stored information.

44. A processor-readable medium according to claim 43, wherein the telephone answering method further comprises the step of answering telephone calls to telephone numbers for which telephone calls are being answered by the telephone answering method.

45. A processor-readable medium according to claim 44, wherein the answering step includes the step of a user of a terminal answering, with the terminal, telephone calls to telephone numbers for which telephone calls are being answered by the telephone answering method.

46. A processor-readable medium according to claim 45, wherein the user is an operator of a telephone answering service; and wherein the terminal is an operator station of the telephone answering service.

47. A processor-readable medium according to claim 45, wherein the user is an operator of a call center; and wherein the terminal is an operator station of the call center.

48. A processor-readable medium according to claim 45, wherein the user is an individual user; and wherein the terminal is a personal computer or a workstation used by the individual user.

49. A processor-readable medium according to claim 45, wherein the terminal includes an input device; and wherein the user uses the input device to answer a telephone call, which is waiting to be answered by the user, to a telephone number for which telephone calls are being answered by the telephone answering method.

50. A processor-readable medium according to claim 49, wherein the displaying step further includes the step of, when the telephone call answered by the user is a telephone call to a telephone number having a Web page associated therewith, displaying to the user the Web page associated with the telephone number of the telephone call answered by the user in response to the telephone call being answered by the user and the URL retrieved from the stored information.

51. A processor-readable medium according to claim 49, wherein the displaying step further includes the step of, when the telephone call answered by the user is a telephone call to a telephone number having a Web page associated therewith, displaying to the user, using a Web browser, the Web page associated with the telephone number of the telephone call answered by the user in response to the telephone call being answered by the user and the URL retrieved from the stored information.

52. A processor-readable medium according to claim 49, wherein a plurality of telephone calls answered by the user may be active simultaneously.

53. A processor-readable medium according to claim 52, wherein the telephone answering method further comprises the step of the user using the input device to move between the active answered telephone calls to select one of the active answered telephone calls for processing.

54. A processor-readable medium according to claim 52, wherein the displaying step further includes the step of, when any of the active answered telephone calls is a telephone call to a telephone number having a Web page associated therewith, displaying to the user the Web page associated with the telephone number of the active answered telephone call in response to the active answered telephone call being answered by the user and the URL retrieved from the stored information.

55. A processor-readable medium according to claim 54, wherein the telephone answering method further comprises the step of the user using the input device to move between the active answered telephone calls to select one of the active answered telephone calls for processing; and wherein the displaying step further includes the step of, as the user moves between the active answered telephone calls to select one of the active answered telephone calls for processing, displaying to the user the Web page associated with the telephone number of the active answered telephone call which the user has selected for processing if the selected active answered telephone call is to a telephone number having a Web page associated therewith.

56. A processor-readable medium according to claim 52, wherein the telephone answering method further comprises the step of the user issuing a single command with the input device to move between the active answered telephone calls to select one of the active answered telephone calls for processing.

57. A processor-readable medium according to claim 56, wherein the input device includes a keyboard; and wherein the user issues the single command with a single keystroke on the keyboard.

58. A processor-readable medium according to claim 56, wherein the input device includes a pointing device; and wherein the user issues the single command with a single operation of the pointing device.

59. A processor-readable medium according to claim 45, wherein the telephone answering method further comprises the step of displaying to the user an indication that a telephone call to a telephone number for which telephone calls are being answered by the telephone answering method is waiting to be answered by the user.

60. A processor-readable medium according to claim 45, wherein the answering step further includes the step of automatically answering telephone calls to telephone numbers for which telephone calls are being answered by the telephone answering method without requiring the attention of the user; and wherein the storing step further includes the step of storing information specifying whether telephone calls to each of the telephone numbers for which telephone calls are being answered by the telephone answering method are to be answered initially by the user or automatically without requiring the attention of the user.

61. A processor-readable medium according to claim 60, wherein the telephone answering method further comprises the step of, when a telephone call to a telephone number for which telephone calls are being answered by the telephone answering method has been answered automatically without requiring the attention of the user, giving a caller who has made the telephone call which has been answered automatically the option to have the telephone call transferred for answering by the user.

62. A processor-readable medium according to claim 43, wherein the Web page associated with the telephone number of the telephone call answered by the telephone answering method is located on the Internet.

63. A processor-readable medium according to claim 43, wherein the Web page associated with the telephone number of the telephone call answered by the telephone answering method is located on an intranet.

* * * * *